US012596324B2

(12) United States Patent
Hayashida et al.

(10) Patent No.: US 12,596,324 B2
(45) Date of Patent: Apr. 7, 2026

(54) IMAGE FORMING APPARATUS INCLUDING MOTOR SUPPORTED BY FRAME MEMBER AND METAL PLATES

(71) Applicant: CANON KABUSHIKI KAISHA, Tokyo (JP)

(72) Inventors: Kei Hayashida, Tokyo (JP); Kohei Koguchi, Kanagawa (JP); Masaki Tanaka, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/794,075

(22) Filed: Aug. 5, 2024

(65) Prior Publication Data

US 2024/0393738 A1 Nov. 28, 2024

Related U.S. Application Data

(62) Division of application No. 17/983,626, filed on Nov. 9, 2022, now Pat. No. 12,085,889.

(30) Foreign Application Priority Data

Nov. 26, 2021 (JP) ................................ 2021-191856
Dec. 20, 2021 (JP) ................................ 2021-206460

(51) Int. Cl.
*G03G 21/00* (2006.01)
*G03G 21/16* (2006.01)

(52) U.S. Cl.
CPC ..... *G03G 21/1619* (2013.01); *G03G 21/1671* (2013.01); *G03G 2221/1606* (2013.01); *G03G 2221/1678* (2013.01)

(58) Field of Classification Search
CPC ........... G03G 21/1619; G03G 21/1647; G03G 21/1671; G03G 2221/1606; G03G 2221/1657; G03G 2221/1678
(Continued)

(56) References Cited

U.S. PATENT DOCUMENTS 5,539,447 A 7/1996 Akuta et al.
7,303,346 B2 12/2007 Ogi et al.
(Continued)

FOREIGN PATENT DOCUMENTS

CN 102854767 A 1/2013
JP 2004177602 A 6/2004
(Continued)

OTHER PUBLICATIONS

Partial European Search Report issued in European Appln. No. 22208720.7, mailed May 2, 2023.
(Continued)

*Primary Examiner* — Robert B Beatty
(74) *Attorney, Agent, or Firm* — ROSSI, KIMMS & McDOWELL LLP

(57) ABSTRACT

An image forming apparatus includes an image bearing member, a frame member connected to first and second metal plates supporting the image bearing member, and a motor disposed on the first metal plate and between the first and second metal plates in a rotation-axis direction of the image bearing member. The frame member includes a reinforcing surface formed in an area in the rotation-axis direction in which the motor is not disposed, and when viewed in the rotation-axis direction, the reinforcing surface and the motor partially overlap with each other. A portion of the motor projects from the reinforcing surface toward a direction opposite to the image bearing member. A shield metal plate is connected to the first and second metal plates and the frame member and covers the portion of the motor from a side opposite to the image bearing member.

11 Claims, 24 Drawing Sheets

(58) Field of Classification Search
USPC .................................................. 399/107, 167
See application file for complete search history.

(56) References Cited

U.S. PATENT DOCUMENTS

| | | | | |
|---|---|---|---|---|
| 7,453,615 | B2 | 11/2008 | Nakajima | |
| 7,466,938 | B2* | 12/2008 | Tokuzaki | G03G 21/1604 399/107 |
| 7,586,508 | B2 | 9/2009 | Tamaru et al. | |
| 8,339,436 | B2 | 12/2012 | Morooka | |
| 8,363,083 | B2 | 1/2013 | Matsuura | |
| 8,493,427 | B2 | 7/2013 | Oki et al. | |
| 9,785,113 | B2 | 10/2017 | Takezawa | |
| 10,345,751 | B2 | 7/2019 | Kawai | |
| 2004/0095456 | A1 | 5/2004 | Yoshihara et al. | |
| 2008/0002341 | A1* | 1/2008 | Tomatsu | G03G 21/1619 361/679.02 |
| 2009/0179513 | A1* | 7/2009 | Cho | H02K 5/24 399/167 |
| 2009/0274488 | A1 | 11/2009 | Sugiyama | |
| 2011/0102983 | A1* | 5/2011 | Souda | G03G 21/1619 361/679.01 |
| 2013/0004198 | A1 | 1/2013 | Tomatsu | |
| 2017/0277115 | A1 | 9/2017 | Yamamura | |
| 2018/0088518 | A1* | 3/2018 | Fuse | G03G 15/6529 |
| 2021/0084189 | A1 | 3/2021 | Sato et al. | |
| 2021/0132521 | A1 | 5/2021 | Yamamoto et al. | |
| 2021/0200139 | A1 | 7/2021 | Hashimoto et al. | |

FOREIGN PATENT DOCUMENTS

| | | | |
|---|---|---|---|
| JP | 2005031447 | A | 2/2005 |
| JP | 2016020932 | A | 2/2016 |
| JP | 2017009695 | A | 1/2017 |
| JP | 2021042055 | A | 3/2021 |
| JP | 2021099475 | A | 7/2021 |
| JP | 2022065539 | A | 4/2022 |

OTHER PUBLICATIONS

Office Action issued in U.S. Appl. No. 17/983,626, mailed Feb. 14, 2024.

Notice of Allowance issued in U.S. Appl. No. 17/983,626, mailed May 22, 2024.

Office Action issued in Chinese Appln. No. 202211545118.3 mailed on Aug. 1, 2025.

* cited by examiner

IMAGE FORMING APPARATUS INCLUDING MOTOR SUPPORTED BY FRAME MEMBER AND METAL PLATES

BACKGROUND OF THE INVENTION

Field of the Invention

The present invention relates to an image forming apparatus that forms images on sheets.

Description of the Related Art

In general, an electrophotographic image forming apparatus includes an exposure unit (referred to also as a laser scanner unit) that forms an electrostatic latent image on a photosensitive drum by emitting a laser beam to the photosensitive drum that is electrically charged. Japanese Patent Application Publication No. 2021-042055 discloses an exposure unit fixed to a frame body, such as a metal plate stay made of metal. The metal plate stay links a pair of side plates disposed on both edge sides in a width direction in an image forming apparatus such that the side plates face each other. If the exposure unit vibrates during an image forming operation, an image defect may be produced. Thus, the exposure unit is fixed to a metal plate stay having high rigidity, for reducing vibration of the exposure unit.

By the way, in the interior of an image forming apparatus, many components including a circuit board and a motor are disposed. Such an image forming apparatus is desired to be downsized and reduced in weight, for reducing the installation space of the image forming apparatus, and for reducing cost and saving resources in the production of the image forming apparatus. Japanese Patent Application Publication No. 2016-20932 describes a configuration of an image forming apparatus in which the image forming apparatus is downsized by devising the arrangement of components including a low-voltage power supply portion, a high-voltage power supply portion, and a motor.

SUMMARY OF THE INVENTION

According to one aspect of the invention, an image forming apparatus includes an image bearing member configured to rotate, a frame member including a support surface and made of metal, an exposure unit configured to emit light to a surface of the image bearing member and form an electrostatic latent image thereon, the exposure unit being disposed such that when viewed in a rotation-axis direction of the image bearing member, an emission direction in which the light is emitted to the image bearing member is inclined with respect to the support surface, a support member made of metal and configured to support the exposure unit that is in an inclined posture with respect to the support surface, and a positioning member made of resin and configured to be in contact with the exposure unit and position the exposure unit, wherein the support surface of the frame member is in contact with at least one of the support member or the positioning member, and wherein the exposure unit is configured to be attached to the frame member via the support member and the positioning member.

According to another aspect of the invention, an image forming apparatus includes an image bearing member configured to rotate, a first metal plate configured to support a first end portion of the image bearing member in a rotation-axis direction of the image bearing member, a second metal plate configured to support a second end portion of the image bearing member opposite to the first end portion in the rotation-axis direction, a frame member disposed between the first metal plate and the second metal plate in the rotation-axis direction and connected to each of the first metal plate and the second metal plate, and a motor configured to drive at least one of the image bearing member, a conveyance member configured to convey a recording material, or a process member configured to form an image on the recording material, the motor being disposed on the first metal plate and positioned between the first metal plate and the second metal plate in the rotation-axis direction, wherein the frame member includes a reinforcing surface formed in an area in the rotation-axis direction in which the motor is not disposed, wherein when viewed in the rotation-axis direction, the reinforcing surface and the motor partially overlap with each other and the motor projects from the reinforcing surface toward a direction opposite to the image bearing member, and wherein the image forming apparatus further includes a shield metal plate disposed in an area in the rotation-axis direction in which the motor is disposed, connected to each of the first metal plate and the frame member, and configured to cover a portion of the motor when viewed from a direction opposite to the image bearing member.

Further features of the present invention will become apparent from the following description of exemplary embodiments with reference to the attached drawings.

DESCRIPTION OF THE EMBODIMENTS

Hereinafter, embodiments of the present disclosure will be described with reference to the accompanying drawings.

First Embodiment

Image Forming Apparatus

Figure 1:
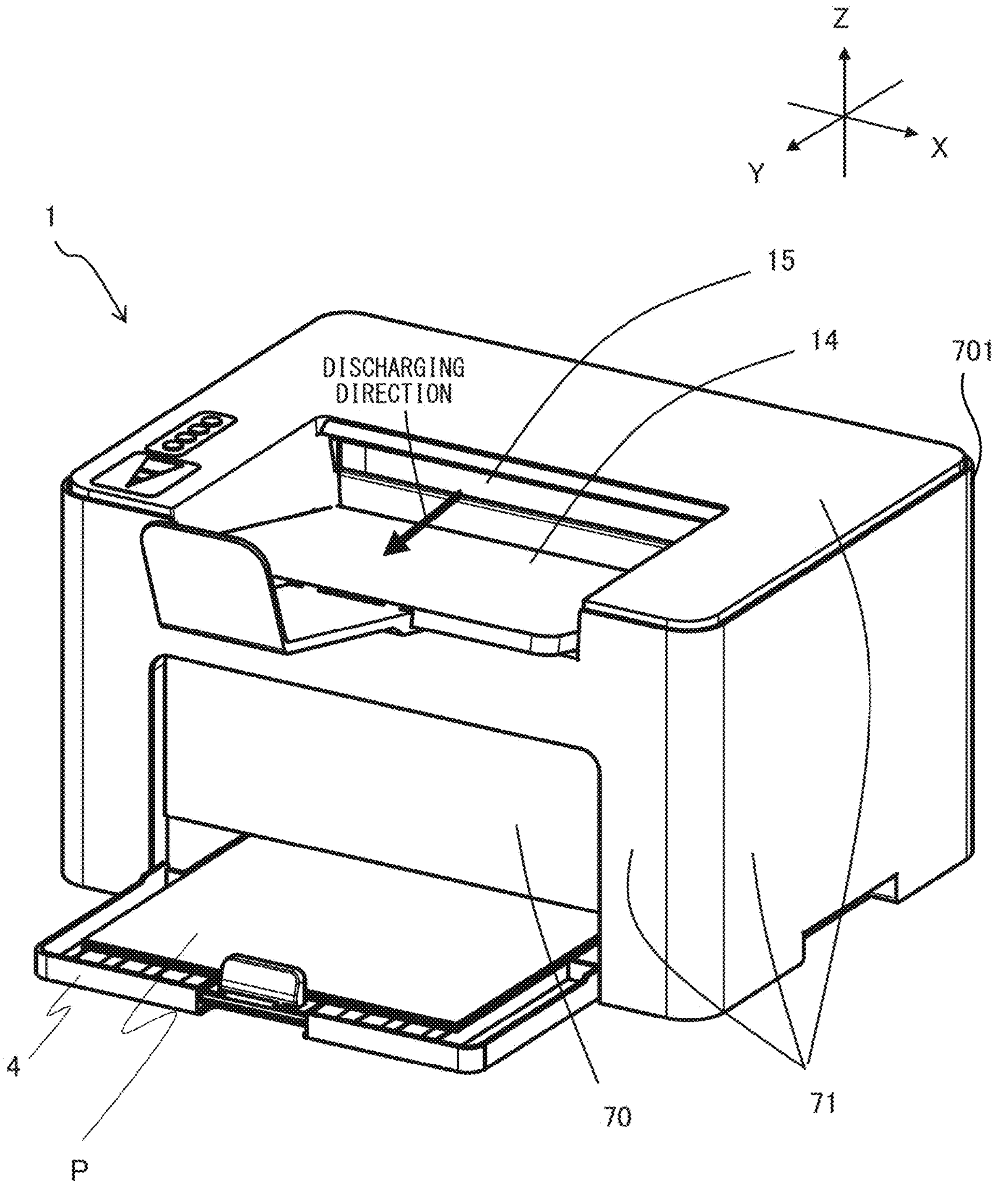
FIG. 1 is a perspective view of an external appearance of an image forming apparatus of a first embodiment.
Figure 2:
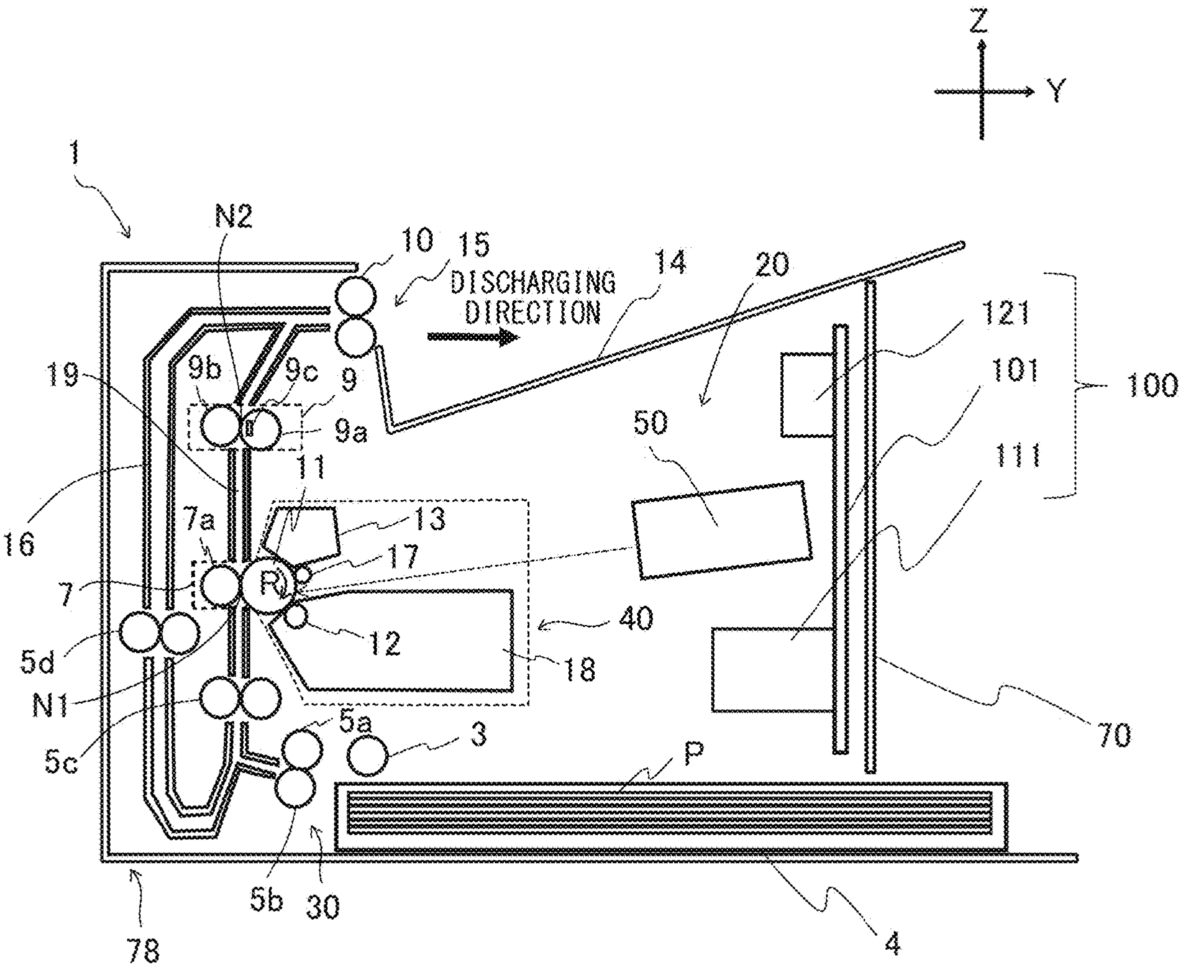
FIG. 2 is a schematic diagram illustrating a configuration of the image forming apparatus of the first embodiment.

First, an outline of an image forming apparatus of a first embodiment will be described with reference to FIGS. 1 and 2. FIG. 1 is a perspective view of an external appearance of an image forming apparatus 1 of the present embodiment. FIG. 2 is a cross-sectional view illustrating a configuration of the image forming apparatus 1. The image forming apparatus 1 of the present embodiment is a monochrome laser beam printer that forms an image on a recording material P in accordance with image information data sent from an external device (not illustrated), such as a personal computer. The recording material P, on which an image is to be formed, may be of sheet materials made of various materials and including paper sheets such as plain paper sheets and thick paper sheets, plastic films such as sheets used for overhead projectors, and cloth sheets.

In the following description, a height direction (opposite to the gravity direction) of the image forming apparatus 1 placed on a horizontal plane is defined as a Z direction. In addition, a direction that intersects the Z direction and that is parallel with a rotation-axis direction (i.e., a main scanning direction or a width direction) of a below-described photosensitive drum 11 (see FIG. 2) is defined as an X direction. In addition, a direction that intersects the X direction and the Z direction is defined as a Y direction. Preferably, the X direction, the Y direction, and the Z direction intersect each other at right angles. For convenience of the description, a positive side in the X direction is referred to as a right side, a negative side in the X direction is referred to as a left side, a positive side in the Y direction is referred to as a front side or a front surface side, a negative side in the Y direction is referred to as a back side or a back surface side, a positive side in the Z direction is referred to as an upper side, and a negative side in the Z direction is referred to as a lower side.

As illustrated in FIG. 1, the image forming apparatus 1 includes a cassette 4 in which the recording material P is stored, and a discharging tray 14 on which the recording material P that has been discharged is stacked. The cassette 4 is disposed so as to be able to be drawn toward the Y direction, and a user can refill the cassette 4 with the recording material P. The recording material P is conveyed from the cassette 4, then an image is formed on the recording material P, and then the recording material P is discharged from a discharging outlet 15 toward a discharging direction (i.e., the Y direction) and stacked on the discharging tray 14. The discharging outlet 15, through which the recording material P passes and is discharged onto the discharging tray 14, is formed on a top surface of a below-described frame body 78 (see FIG. 3). That is, the image forming apparatus 1 of the present embodiment is an apparatus that discharges a recording material from a top surface of the apparatus.

The image forming apparatus 1 includes the frame body (supporting frame body) 78; and a front cover 70, a back cover 701, and an exterior cover 71 are fixed to the frame body 78. The exterior cover 71 is disposed on side faces and a top face of the image forming apparatus 1; and the exterior cover 71, the front cover 70, and the back cover 701 constitute the exterior of the image forming apparatus 1. The front cover 70 is disposed in one portion of a front surface of the image forming apparatus 1, and covers a below-described circuit board 100.

As illustrated in FIG. 2, the image forming apparatus 1 includes an image forming portion (image forming unit) 20, a feeding portion 30, a fixing portion 9, and a discharging roller pair 10. The image forming portion 20 forms a toner image on the recording material P, the feeding portion 30 feeds the recording material P, and the fixing portion 9 fixes the toner image formed by the image forming portion 20, to the recording material P. The image forming portion 20, the feeding portion 30, the fixing portion 9, and the discharging roller pair 10 are housed in the frame body 78.

The image forming portion 20 includes an exposure unit 50, an electrophotographic process unit 40, and a transfer unit 7. The transfer unit 7 includes a transfer roller 7*a*, which transfers a toner image borne by a photosensitive drum 11 of the process unit 40, onto the recording material P. The process unit 40 includes the photosensitive drum 11, a cleaning unit 13, a charging roller 17, a developing roller 12, and a developer container 18 that contains toner.

The photosensitive drum 11 is a cylindrically-shaped photosensitive member, and functions as an image bearing member that bears an electrostatic latent image and a toner image. The photosensitive drum 11 of the present embodiment includes a drum-like base body, and a photosensitive layer formed on the base body. The base body is made of aluminum, and the photosensitive layer is made of organic photoconductor that has a negative charging polarity. The photosensitive drum 11 is driven and rotated by a motor (not illustrated) at a predetermined process speed, in a predetermined direction (indicated by an arrow R).

The charging roller 17 is in contact with the photosensitive drum 11 at a predetermined pressure contact force; and when applied with a predetermined charging voltage by a charging power supply, the charging roller 17 uniformly charges the surface of the photosensitive drum 11 at a predetermined electric potential.

The exposure unit 50 generates a laser beam serving as light in accordance with image information data sent from an external device, and emits the laser beam to the photosensitive drum 11, so that the surface of the photosensitive drum 11 is exposed to and scanned with the laser beam. With this exposure, an electrostatic latent image is formed on the surface of the photosensitive drum 11 in accordance with the image information data.

The developing roller 12 is rotatably supported by the developer container 18. The developer container 18 contains developer that contains toner and carrier. The developing roller 12 is disposed in an opening portion of the developer container 18 so as to face the photosensitive drum 11.

The process unit 40 uses a contact developing system, as a developing system. That is, the toner borne by the developing roller 12 contacts the photosensitive drum 11 in a developing portion (developing area) in which the photosensitive drum 11 and the developing roller 12 face each other. The developing roller 12 is applied with a developing voltage by a developing power supply (not illustrated). Thus, the toner borne by the developing roller 12 is transferred from the developing roller 12 to the surface of the photosensitive drum 11 by the developing voltage in accordance with the electric potential distribution of the surface of the photosensitive drum 11, so that the electrostatic latent image is developed into a toner image.

The fixing portion 9 performs an image fixing process by heating and melting the toner image formed on the recording material, and by applying pressure to the toner image. The fixing portion 9 includes a heating roller 9*a* that includes a fixing heater 9*c*, and a pressing roller 9*b* that is in pressure contact with the heating roller 9*a*.

Next, an image forming operation of the image forming apparatus 1 will be described. When an image forming instruction is sent to the image forming apparatus 1, the image forming portion 20 starts an image forming process in accordance with image information sent from an external device (not illustrated) connected to the image forming apparatus 1.

The exposure unit 50 emits a laser beam toward the photosensitive drum 11 in accordance with the image information received by the image forming apparatus 1. Although not illustrated in the figures, the exposure unit 50 includes a laser oscillator that outputs the laser beam, a polygon mirror and a lens that are used for emitting the laser beam toward the photosensitive drum 11, a scanner motor that rotates the polygon mirror, and a housing that houses and supports these components (the housing supports these components as a whole). The exposure unit 50 is a unit in which the housing houses the above-described components, and the housing is a substantially rectangular parallelepiped. Thus, the exposure unit 50 is referred to also as an optical box.

The photosensitive drum 11 is charged by the charging roller 17. When the photosensitive drum 11 is irradiated with the laser beam by the exposure unit 50, an electrostatic latent image is formed on the surface of the photosensitive drum 11. The electrostatic latent image is then developed by the developing roller 12 that rotates while bearing the toner, so that a toner image is formed on the photosensitive drum 11.

The feeding portion 30 includes the cassette 4 on which the recording material P is stacked, a pickup roller 3, a feed roller 5*a*, and a separation roller 5*b*. In parallel with the above-described image forming process, the pickup roller 3 feeds the recording material P supported by the cassette 4. The recording material P fed by the pickup roller 3 is separated from others, one by one, by the feed roller 5*a* and the separation roller 5*b*; and is conveyed to a conveyance roller pair 5*c*. The recording material P is then conveyed by the conveyance roller pair 5*c*, toward a transfer nip N1 formed by a transfer roller 7*a* and the photosensitive drum 11.

The transfer roller 7*a* is applied with a transfer voltage by a transfer power source (not illustrated), and the toner image borne by the photosensitive drum 11 is transferred onto the recording material P having been conveyed by the conveyance roller pair 5*c*. The recording material Ponto which the toner image has been transferred is conveyed to the fixing portion 9, and the toner image is heated and pressed when the recording material P passes through a fixing nip N2 formed between the heating roller 9*a* and the pressing roller 9*b* of the fixing portion 9. With this operation, the toner is melted, and then solidifies and adheres to the recording material P, so that the toner image is fixed to the recording material P. The recording material P having passed through the fixing portion 9 is discharged to the outside of the image forming apparatus 1 from the discharging outlet 15, toward the discharging direction (i.e., the Y direction), by the discharging roller pair 10; and is stacked on the discharging tray 14.

If images are to be formed on both sides of the recording material P, the recording material P having an image formed on a first surface thereof is switch-backed by the discharging roller pair 10, and is guided to a duplex conveyance path 16. The recording material P having been guided to the duplex conveyance path 16 is conveyed again toward the transfer roller 7*a* through a conveyance path 19, by a duplex-conveyance roller pair 5*d*. After an image is formed on a second surface of the recording material P by the transfer roller 7*a*, the recording material P is discharged to the outside of the image forming apparatus 1 by the discharging roller pair 10. The toner left on the photosensitive drum 11 after a toner image is transferred onto the recording material P is removed by the cleaning unit 13.

As illustrated in FIG. 2, the image forming apparatus 1 also includes a circuit board 100. The circuit board 100 includes a wiring board (printed board) 101 made of insulator; and on a first side of the wiring board 101, electric components 111 and 121 are mounted via solder. Since a conductor pattern is formed on and in the wiring board 101, many components including the electric components 111 and 121 are electrically connected with each other. For example, the circuit board 100 has a function that converts alternating current supplied from an external power source to the image forming apparatus 1, into direct current; and a function that converts a voltage for obtaining a predetermined voltage necessary for the image forming process. The circuit board 100 is disposed in a clearance formed between the front cover 70 and the exposure unit 50 in the discharging direction, and a surface of the wiring board 101 on which the electric components 111 and 121 are mounted faces the interior of the frame body 78.

Frame Body

Figure 3:
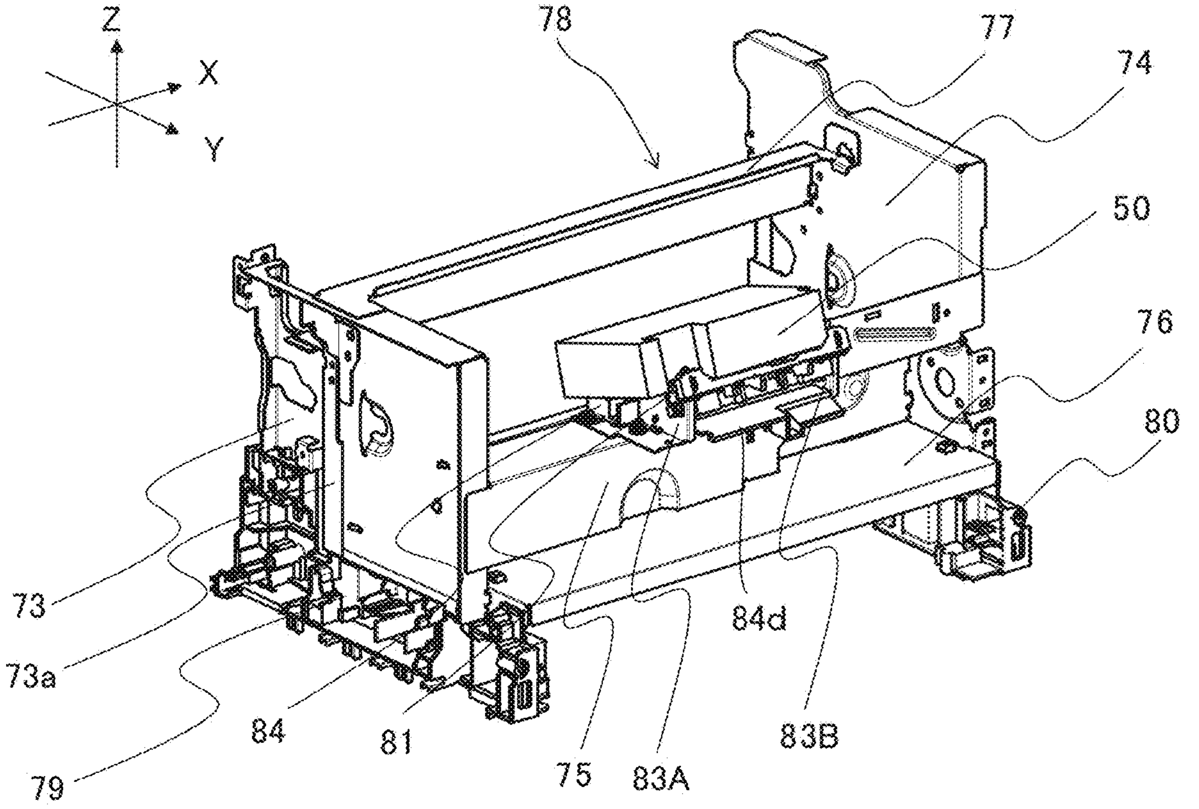
FIG. 3 is a perspective view illustrating a frame body and an exposure unit of the first embodiment.

Next, the frame body 78 will be described. As illustrated in FIG. 3, the frame body 78 includes a pair of a left side-plate frame 73 and a right side-plate frame 74 made of metal, and a plurality of metal plate stays 75, 76, and 77. The left side-plate frame 73 and the right side-plate frame 74 are disposed, substantially parallel with each other, and face each other. The left side-plate frame 73 and the right side-plate frame 74 are disposed on both end sides of the photosensitive drum 11 in the width direction. The left side-plate frame 73 and the right side-plate frame 74 support the metal plate stays 75, 76, and 77, which are metal plate members having high rigidity, such that the metal plate stays 75, 76, and 77 are bridged between the left side-plate frame 73 and the right side-plate frame 74. The metal plate stay 75 is an example of a third metal plate (metal plate frame, bridging frame) that extends in the rotation-axis direction (i.e., the X direction) of the photosensitive drum 11, and that connects the right side-plate frame 74 (i.e., a first metal plate) and the left side-plate frame 73 (i.e., a second metal plate). On the left side-plate frame 73, a left side-plate pillar 73*a* (see FIG. 4A) that is a reinforcing member is disposed so as to extend upward from below; on the right side-plate frame 74, a right side-plate pillar 74*a* (see FIG. 5A) that is a reinforcing member is disposed so as to extend upward from below. Thus, the rigidity of the frame body 78 is increased by the left side-plate pillar 73*a* and the right side-plate pillar 74*a*.

Figure 4A:
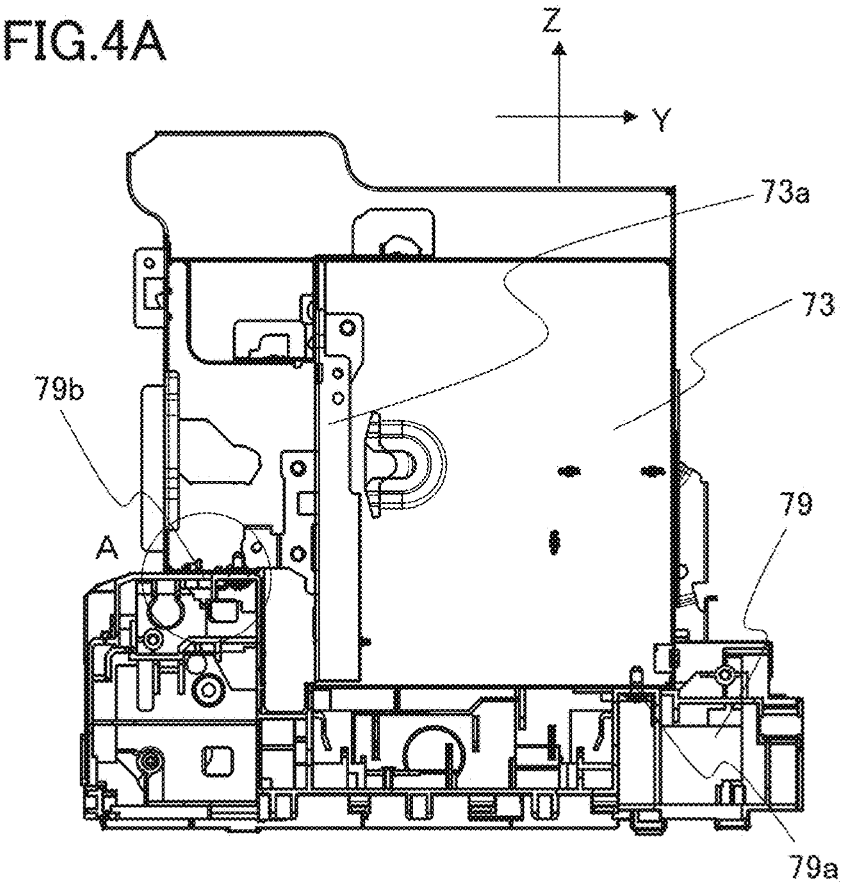
FIG. 4A is a left side view for illustrating support of the frame body of the first embodiment.
Figure 4B:
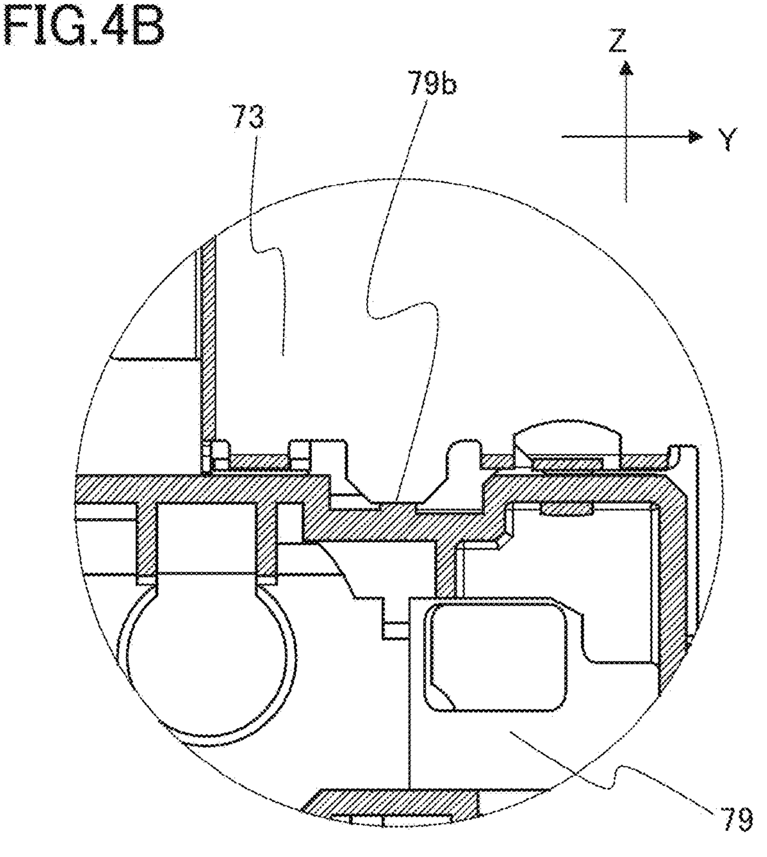
FIG. 4B is an enlarged cross-sectional view illustrating a contact point located on a left side and on a back side.

Below the frame body 78, a left floor frame 79 and a right floor frame 80 that are made of resin are disposed. The left floor frame 79 and the right floor frame 80 are in contact with a floor, and support the frame body 78. Specifically, as illustrated in FIG. 4A, the left side-plate frame 73 is in contact with at least two portions of the left floor frame 79, including a contact portion 79*a* and a contact portion 79*b*; and is supported by the left floor frame 79. The contact portion 79*a* is in contact with a bent surface of the left side-plate frame 73, on the front side with respect to a center portion of the left side-plate frame 73 in the Y direction. The bent surface is formed by bending the left side-plate frame 73, because the importance is placed on the rigidity of the left side-plate frame 73. In this manner, the contact portion 79*a* is in contact with the left side-plate frame 73, on the front side with respect to a center portion of the left side-plate frame 73 in the Y direction. On the other hand, as illustrated in FIG. 4B, the contact portion 79*b* is in contact with an abutment surface of the left side-plate frame 73. This is because the contact portion 79*b* is located closer to units, such as the conveyance roller pair 5*c* and the transfer roller 7*a*, that are involved with the conveyance of the recording material P (see FIG. 2), and because such arrangement of the contact portion 79*a* can improve positional accuracy of the left side-plate flame 73. Thus, the contact portion 79*b* is in contact with the left side-plate frame 73, on the back side with respect to a center portion of the left side-plate frame 73 in the Y direction.

Figure 5A:
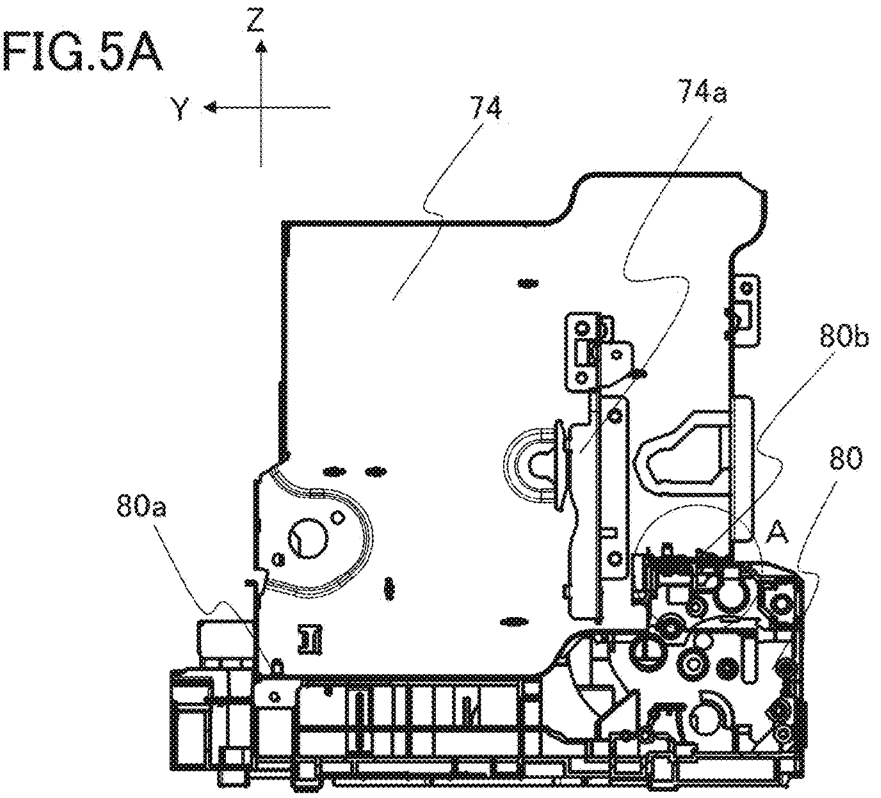
FIG. 5A is a right side view for illustrating support of the frame body of the first embodiment.
Figure 5B:
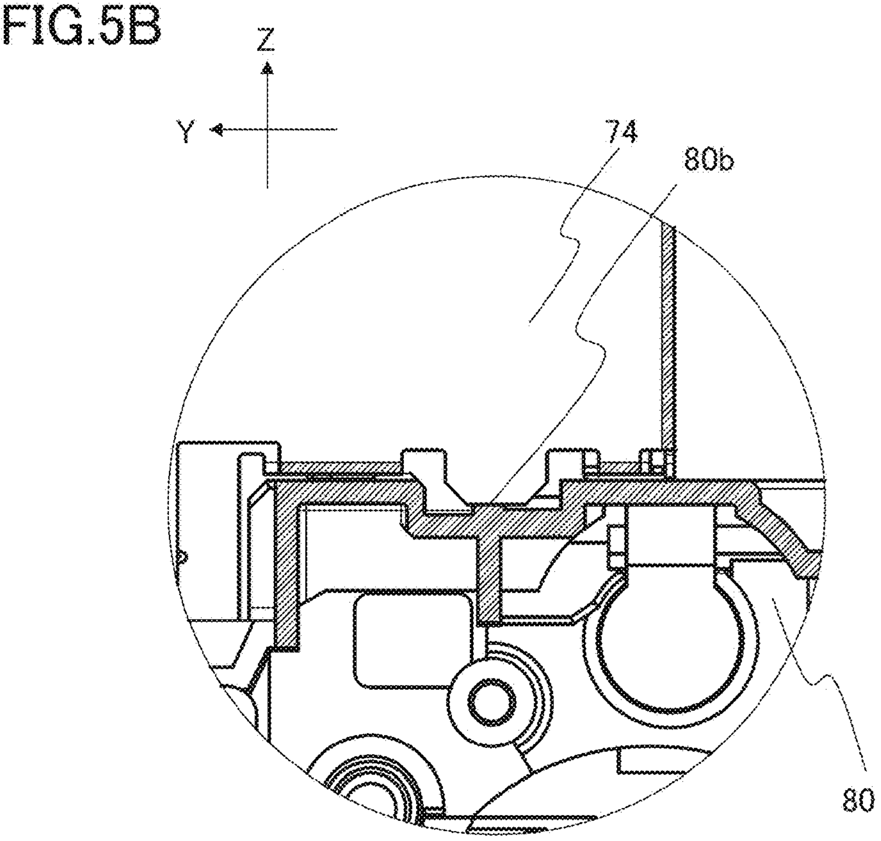
FIG. 5B is an enlarged cross-sectional view illustrating a contact point located on a right side and on a back side.

Similarly, as illustrated in FIG. 5A, the right side-plate frame 74 is in contact with at least two portions of the right floor frame 80, including a contact portion 80*a* and a contact portion 80*b*; and is supported by the right floor frame 80. The contact portion 80*a* is in contact with a bent surface of the right side-plate frame 74, on the front side with respect to a center portion of the right side-plate frame 74 in the Y direction. The bent surface is formed by bending the right side-plate frame 74, because the importance is placed on the rigidity of the right side-plate frame 74. In this manner, the contact portion 80*a* is in contact with the right side-plate frame 74, on the front side with respect to a center portion of the right side-plate frame 74 in the Y direction. On the other hand, as illustrated in FIG. 5B, the contact portion 80*b* is in contact with an abutment surface of the right side-plate frame 74. This arrangement of the contact portion 80*b* can improve positional accuracy of the right side-plate flame 74. Thus, the contact portion 80*b* is in contact with the right side-plate frame 74, on the back side with respect to a center portion of the right side-plate frame 74 in the Y direction.

Configuration for Positioning

Figure 6:
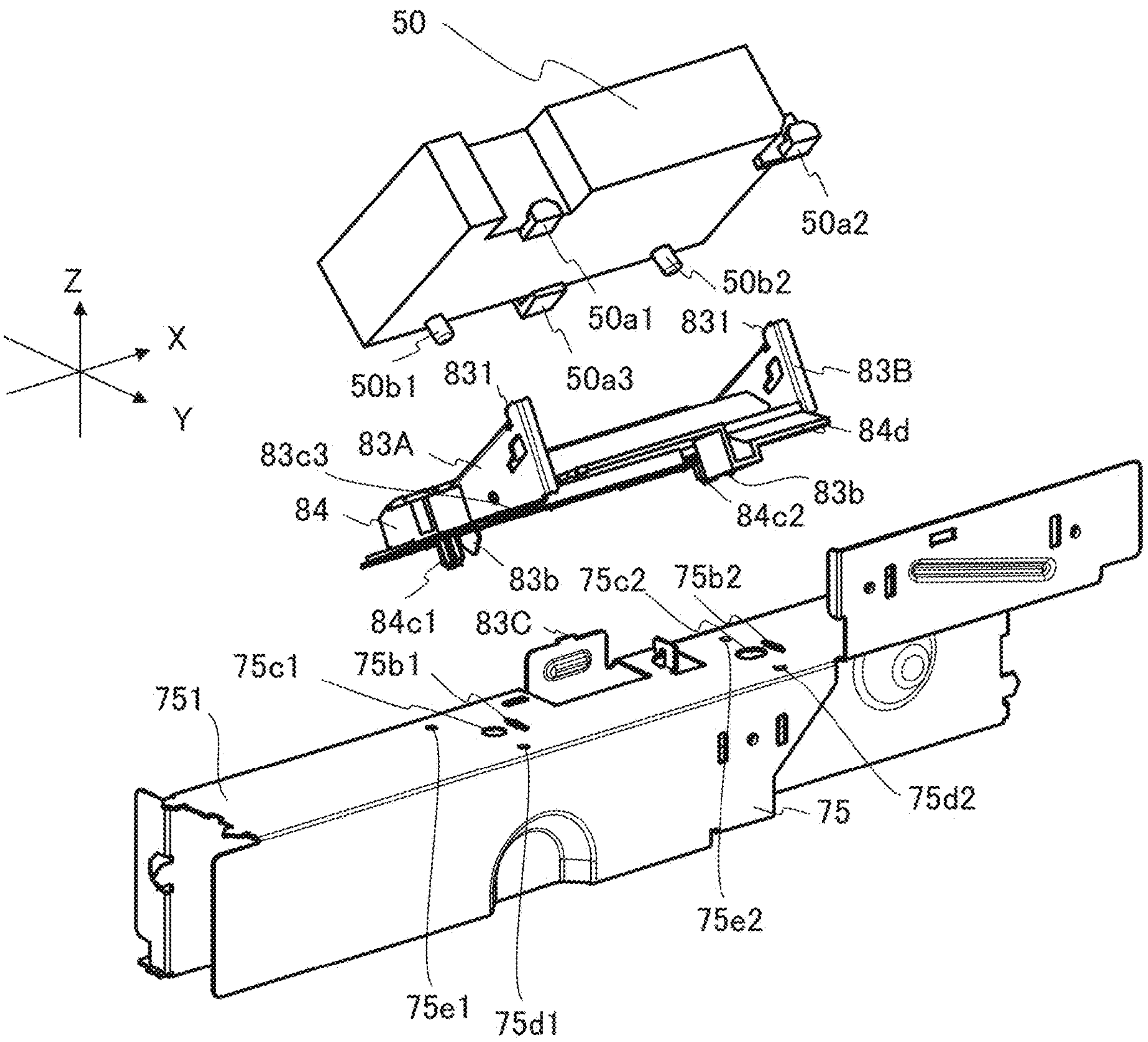
FIG. 6 is a perspective view illustrating the exposure unit, a fixing attachment, support members, and a metal plate stay of the first embodiment.

Next, a configuration for positioning the exposure unit 50 in the frame body 78 will be described with reference to FIGS. 2, 3, and 6 to 15. FIG. 6 is a perspective view illustrating the exposure unit 50, a fixing attachment 84, support members 83A, 83B, and 83C, and the metal plate stay 75. Note that in FIG. 6, for allowing a reader to easily understand the description, the exposure unit 50, the fixing attachment 84, the first support member 83A, and the second support member 83B are illustrated, rotated on the X axis from their postures in which they are actually fixed to the metal plate stay 75.

In the present embodiment, the exposure unit 50 is fixed to the metal plate stay 75 in a state where the exposure unit 50 is attached to the fixing attachment 84. The fixing attachment 84 that serves as a positioning member is made of resin, and serves as an intermediate member. As illustrated in FIG. 6, the exposure unit 50 can be attached to a first side of the fixing attachment 84, and a second side of the fixing attachment 84 opposite to the first side can be fixed to the metal plate stay 75. The fixing attachment 84 positions the exposure unit 50 such that the exposure unit 50 is inclined with respect to a surface 751 of the metal plate stay 75 so that the exposure unit 50 can emit a laser beam to the surface of the photosensitive drum 11 (see FIG. 2) at a predetermined angle in a state where the fixing attachment 84 is fixed to the metal plate stay 75. That is, the posture of the exposure unit 50 obtained when the exposure unit 50 is assembled to the image forming apparatus and viewed in the rotation-axis direction (i.e., the X direction) of the photosensitive drum 11 is set so that the emission direction of the laser beam, used for exposing the photosensitive drum 11, has a predetermined angle with respect to the surface 751 of the metal plate stay 75. In the present embodiment, the surface 751 of the metal plate stay 75 is a support surface that is in contact with at least one of the support members (83A and 83B) or the fixing attachment 84, and that supports the support members 83A, 83B, and 83C and the fixing attachment 84. That is, on the metal plate stay 75, the surface 751 of the metal plate stay 75 is in contact with the first support member 83A, the second support member 83B, and/or the fixing attachment 84; and supports these components. In addition, in the surface 751 of the metal plate stay 75, below-described insertion hole portions 75*b*1 and 75*b*2, first fixing hole portions 75*c*1 and 75*c*2 serving as first hole portions, and screw-fixing hole portions 75*d*1, 75*d*2, 75*e*1, and 75*e*2 are formed.

In a state where the fixing attachment 84 is fixed to the metal plate stay 75, the exposure unit 50 is supported by the first support member 83A, the second support member 83B, and the third support member 83C disposed on the metal plate stay 75. The support members 83A, 83B, and 83C are made of metal or the like whose rigidity is higher than that of the fixing attachment 84; and support the exposure unit 50 fixed to the fixing attachment 84, in a state where the fixing attachment 84 is fixed to the metal plate stay 75. Three points at which the support members 83A, 83B, and 83C are in contact with the exposure unit 50 constitute a virtual support plane on which the exposure unit 50 is supported by the support members 83A, 83B, and 83C. The support plane is inclined with respect to the surface 751 of the metal plate stay 75. That is, a support portion of the first support member 83A, a support portion of the second support member 83B, and a support portion of the third support member 83C support the exposure unit 50; and define the support plane inclined with respect to the surface 751 of the metal plate stay 75 at a predetermined angle. The fixing attachment 84 is disposed for positioning the exposure unit 50 on the support plane, and the exposure unit 50 is supported also by the fixing attachment 84.

In the present embodiment, the first support member 83A and the second support member 83B are formed, separated from the fixing attachment 84; and can be fixed to the metal plate stay 75. In contrast, the third support member 83C is formed, integrated with the metal plate stay 75. For example, the third support member 83C is formed by partly cutting the surface 751 of the metal plate stay 75 and bending one portion of the surface 751 toward the Z direction.

Exposure Unit

Figure 7:
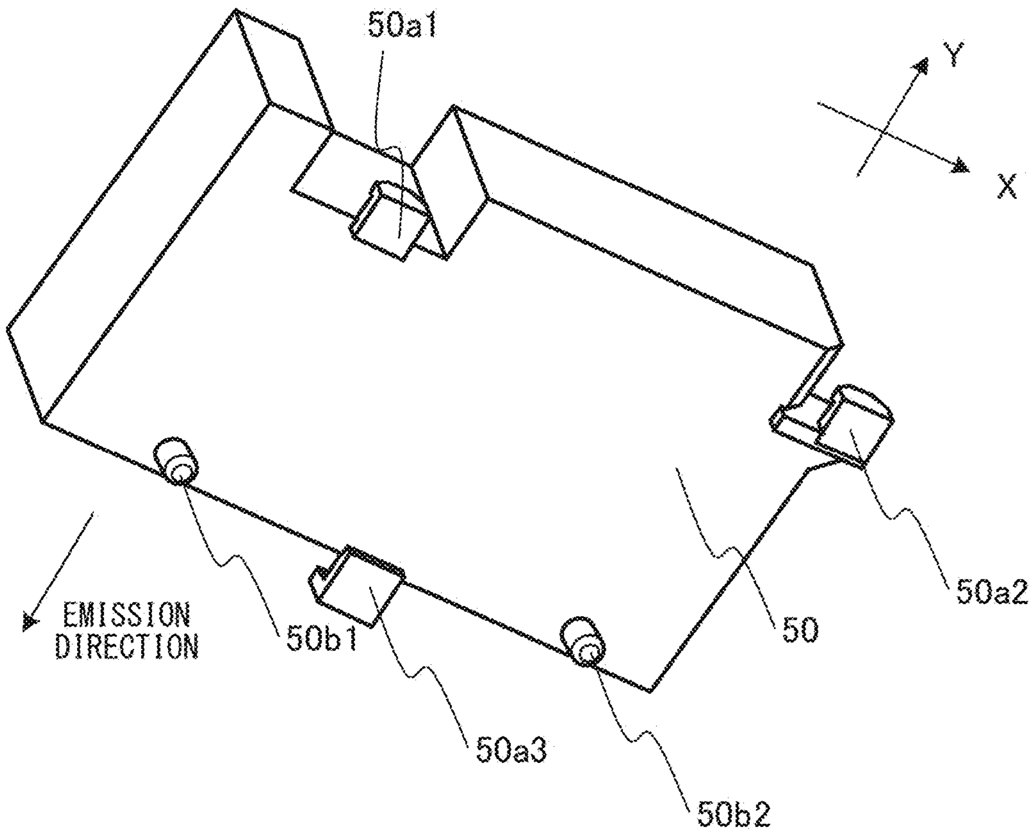
FIG. 7 is a perspective view illustrating the exposure unit of the first embodiment.

FIG. 7 is a perspective view illustrating the exposure unit 50 viewed from the fixing attachment 84 side. As illustrated in FIG. 7, the exposure unit 50 includes a first supported portion 50*a*1, a second supported portion 50*a*2, and a third supported portion 50*a*3, which are formed on the fixing attachment 84 side. The first supported portion 50*a*1, the second supported portion 50*a*2, and the third supported portion 50*a*3 are supported portions or abutted portions, which are respectively abutted against and supported by the above-described first support member 83A, second support member 83B, and third support member 83C.

The first supported portion 50*al* and the second supported portion 50*a*2 are disposed upstream of a center portion of the exposure unit 50 in the emission direction (extending toward the negative side in the Y direction) of the laser beam emitted from the exposure unit 50 to the photosensitive drum 11, and at positions separated from each other in the width direction. In contrast, the third supported portion 50*a*3 is disposed downstream of a center portion of the exposure unit 50 in the emission direction of the laser beam, and at a position between the first supported portion 50*al* and the second supported portion 50*a*2 in the width direction.

Furthermore, the exposure unit 50 includes a plurality of first boss portions 50*b*1 and 50*b*2 formed on the fixing attachment 84 side to fit in the fixing attachment 84. The first boss portions 50*b*1 and 50*b*2 are formed downstream of a center portion of the exposure unit 50 in the emission direction of the laser beam, and at positions separated from each other in the width direction. Specifically, the first boss portions 50*b*1 and 50*b*2 are positioned on both end sides of the exposure unit 50 in the width direction, such that the third supported portion 50*a*3 is interposed between the first boss portions 50*b*1 and 50*b*2 in the width direction.

Fixing Attachment

Figure 8:
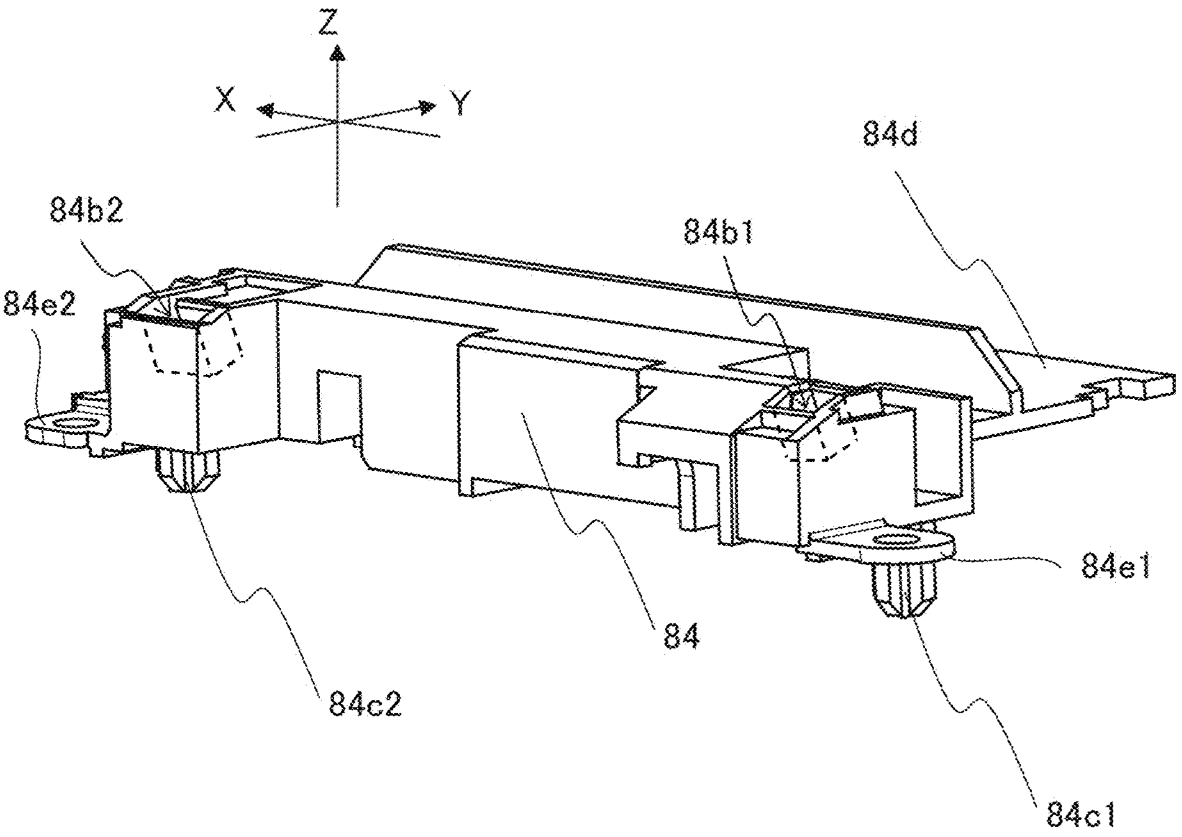
FIG. 8 is a perspective view illustrating the fixing attachment of the first embodiment.

FIG. 8 is a perspective view illustrating the fixing attachment 84 viewed from the exposure unit 50 side. The fixing attachment 84 includes second fixing hole portions 84*b*1 and 84*b*2 formed on the exposure unit 50 side (i.e., a first side). The second fixing hole portions 84*b*1 and 84*b*2 serve as second hole portions and are formed so that the first boss portions 50*b*1 and 50*b*2 of the exposure unit 50 can be fit in the second fixing hole portions 84*b*1 and 84*b*2. In addition, the second fixing hole portions 84*b*1 and 84*b*2 are formed downstream of a center portion of the fixing attachment 84 in the emission direction of the laser beam, and at positions separated from each other in the width direction. Specifically, the second fixing hole portions 84*b*1 and 84*b*2 are positioned on both end sides of the fixing attachment 84 in the width direction. In the present embodiment, the second fixing hole portion 84*b*2 located on the right side in the X direction does not strictly prevent the first boss portion 50*b*2 from moving. Instead, the second fixing hole portion 84*b*1 located on the left side positions the exposure unit 50, and the second fixing hole portion 84*b*2 located on the right side prevents the exposure unit 50 from rotating.

The fixing attachment 84 also includes second boss portions 84*c*1 and 84*c*2 formed on the metal plate stay 75 side (i.e., a second side), for positioning the fixing attachment 84 with respect to the metal plate stay 75. For example, the second boss portions 84*c*1 and 84*c*2 are cross-shaped bosses. The direction of the shaft portions of the second boss portions 84*c*1 and 84*c*2 formed on the second side is different from the direction of the above-described second fixing hole portions 84*b*1 and 84*b*2 formed on the first side.

For example, the direction of the shaft portions of the second boss portions 84*c*1 and 84*c*2 formed on the second side is a first direction that is perpendicular to the surface 751 of the metal plate stay 75, to which the fixing attachment 84 is fixed. However, the direction in which the second fixing hole portions 84*b*1 and 84*b*2 on the first side are formed is a second direction that is different from the first direction. In the present embodiment, as indicated by dotted lines in FIG. 8, the second fixing hole portions 84*b*1 and 84*b*2 are formed inclined such that the entrance side of the second fixing hole portions 84*b*1 and 84*b*2 are located downstream of the back side of the second fixing hole portions 84*b*1 and 84*b*2 in the Y direction. Since the fixing attachment 84 is a resin component, the fixing attachment 84 has advantageously higher flexibility for forming shape than that of metal components. Thus, it is easy to form the second fixing hole portions 84*b*1 and 84*b*2 on the first side and the second boss portions 84*c*1 and 84*c*2 on the second side such that the direction of the second fixing hole portions 84*b*1 and 84*b*2 is different from the direction of the second boss portions 84*c*1 and 84*c*2.

Support Members

Figure 9:
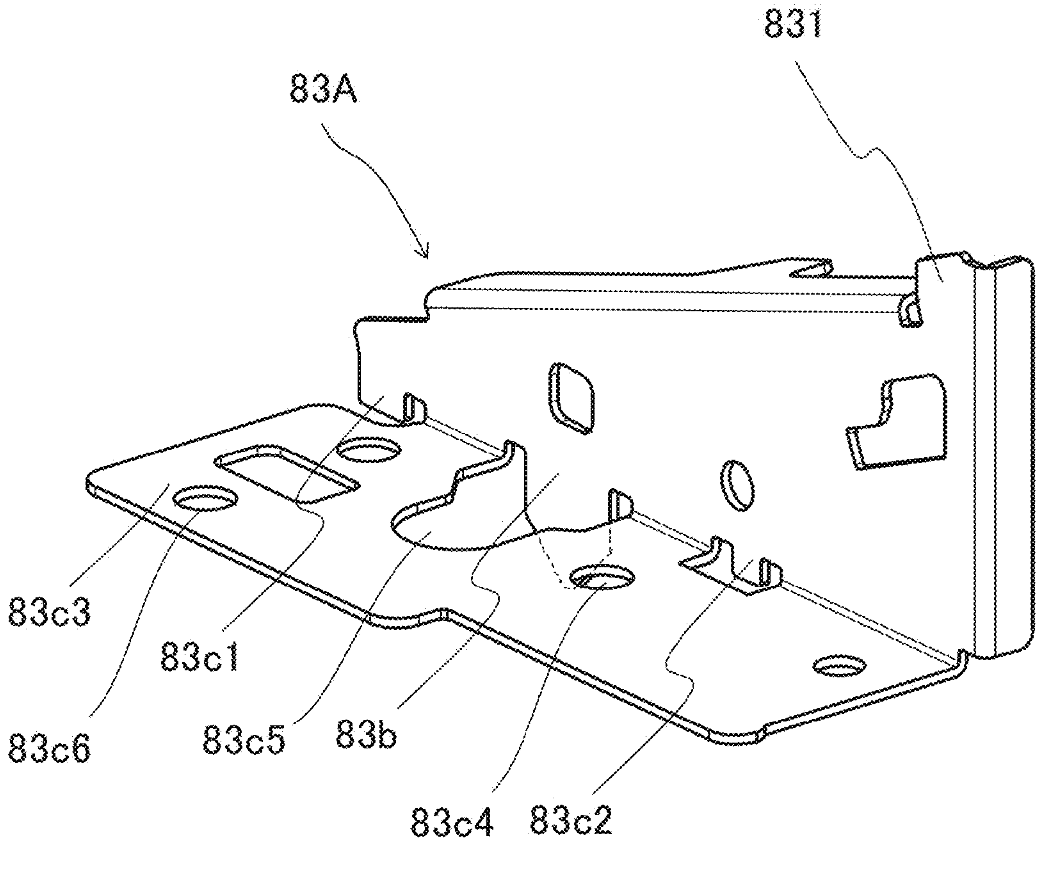
FIG. 9 is a perspective view illustrating a first support member of the first embodiment.

FIG. 9 is a perspective view illustrating the first support member 83A. Note that since the second support member 83B may have the same structure as that of the first support member 83A, the description and illustration thereof will be omitted. As illustrated in FIG. 9, the first support member 83A includes a support portion 831 that supports the exposure unit 50. In addition, the first support member 83A includes an insertion portion 83*b* that positions the first support member 83A with respect to the metal plate stay 75, and abutment portions 83*c*1 and 83*c*2 that abut against the metal plate stay 75. Furthermore, the first support member 83A includes a fixing portion 83*c*3 that fixes the first support member 83A to the metal plate stay 75. In the present embodiment, the first support member 83A is fixed to the metal plate stay 75 via screws such that the support portion 831 of the first support member 83A is parallel with the left side-plate frame 73. Similarly, the second support member 83B having the same shape as that of the first support member 83A is fixed to the metal plate stay 75 via screws such that the support portion 831 of the second support member 83B is parallel with the right side-plate frame 74. For this reason, a screw hole portion 83*c*4 is formed in the fixing portion 83*c*3, which is formed like a thin plate, for allowing a screw to pass through the screw hole portion 83*c*4.

As illustrated in FIG. 6, in the surface 751 of the metal plate stay 75, the first fixing hole portions 75*c*1 and 75*c*2, the insertion hole portions 75*b*1 and 75*b*2, and the screw-fixing hole portions 75*d*1, 75*d*2, 75*e*1, and 75*e*2 are formed. The first fixing hole portions 75*c*1 and 75*c*2 are formed so that the second boss portions 84*c*1 and 84*c*2 of the fixing attachment 84 fit in the first fixing hole portions 75*c*1 and 75*c*2. The insertion hole portions 75*b*1 and 75*b*2 are formed so that the insertion portions 83*b* of the first support member 83A and the second support member 83B are inserted into the insertion hole portions 75*b*1 and 75*b*2.

The exposure unit 50 is attached to the first side of the fixing attachment 84 by fitting the first boss portions 50*b*1 and 50*b*2 in the second fixing hole portions 84*b*1 and 84*b*2

(see FIG. 8) of the fixing attachment 84. The fixing attachment 84 is fixed to the metal plate stay 75 by fitting the second boss portions 84*c*1 and 84*c*2 formed on the second side opposite to the first side, in the first fixing hole portions 75*c*1 and 75*c*2 of the metal plate stay 75.

The insertion portion 83*b* of the first support member 83A is inserted into the insertion hole portion 75*b*1 of the metal plate stay 75, and the abutment portions 83*c*1 and 83*c*2 (see FIG. 9) of the first support member 83A are abutted against the metal plate stay 75. Similarly, the insertion portion 83*b* of the second support member 83B is inserted into the insertion hole portion 75*b*2 of the metal plate stay 75, and the abutment portions 83*c*1 and 83*c*2 (see FIG. 9) of the second support member 83B are abutted against the metal plate stay 75. The first support member 83A is fixed to the metal plate stay 75 by placing the fixing portion 83*c*3 on the surface 751 of the metal plate stay 75, then passing a screw through the screw hole portion 83*c*4, and then causing the screw to engage with the screw-fixing hole portion 75*d*1. Similarly, the second support member 83B is fixed to the metal plate stay 75 by placing the fixing portion 83*c*3 on the surface 751 of the metal plate stay 75, then passing a screw through the screw hole portion 83*c*4, and then causing the screw to engage with the screw-fixing hole portion 75*d*2.

The fixing attachment 84 is formed so that part of the fixing attachment 84 is mounted on the fixing portion 83*c*3 of the first support member 83A and the fixing portion 83*c*3 of the second support member 83B. The second boss portion 84*c*1 of the fixing attachment 84 passes through the hole portion 83*c*5 formed in the fixing portion 83*c*3 of the first support member 83A, and fits in the first fixing hole portion 75*c*1 of the metal plate stay 75. The second boss portion 84*c*2 of the fixing attachment 84 passes through the hole portion 83*c*5 formed in the fixing portion 83*c*3 of the second support member 83B, and fits in the first fixing hole portion 75*c*2 of the metal plate stay 75. In addition, in the fixing attachment 84, screw hole portions 84*e*1 and 84*e*2 are formed for allowing screws to pass through the screw hole portions 84*e*1 and 84*e*2. A screw that has passed through the screw hole portion 84*e*1 passes through the hole portion 83*c*6 formed in the fixing portion 83*c*3 of the first support member 83A, and engages with the screw-fixing hole portion 75*e*1 of the metal plate stay 75. Similarly, a screw that has passed through the screw hole portion 84*e*2 passes through the hole portion 83*c*6 formed in the fixing portion 83*c*3 of the second support member 83B, and engages with the screw-fixing hole portion 75*e*2 of the metal plate stay 75. In this manner, the fixing attachment 84 is fixed to the metal plate stay 75.

Thus, the first support member 83A and the second support member 83B (specifically, the fixing portion 83*c*3 of the first support member 83A and the fixing portion 83*c*3 of the second support member 83B) are held between the fixing attachment 84 and the metal plate stay 75; and the first support member 83A and the second support member 83B, together with the fixing attachment 84, are fixed to the metal plate stay 75. In this manner, the exposure unit 50 attached to the fixing attachment 84 is positioned such that the exposure unit 50 is inclined with respect to the surface 751 of the metal plate stay 75 so that the emission angle of the laser beam emitted from the exposure unit 50 to the photosensitive drum 11 is a predetermined angle.

In a state where the fixing attachment 84 is fixed to the metal plate stay 75, the exposure unit 50 is supported by the support portion 831 of the first support member 83A and the support portion 831 of the second support member 83B via the first supported portion 50*al* and the second supported portion 50*a*2. In addition, the third supported portion 50*a*3 is supported by the third support member 83C. In this manner, all the three components (i.e., the first supported portion 50*al*, the second supported portion 50*a*2, and the third supported portion 50*a*3) of the exposure unit 50 are supported by the support members 83A, 83B, and 83C, which are made of metal having higher rigidity than that of the fixing attachment 84 made of resin. As a result, the vibration of the exposure unit 50 can be reduced.

If the exposure unit 50 is supported by only the fixing attachment 84 made of resin, the vibration of the motor disposed in the frame body 78 may transmit to the exposure unit 50, causing vibration of the laser beam. In this case, the vibration of the laser beam may cause image defects. In the present embodiment, however, for reducing vibration of the exposure unit 50, the exposure unit 50 is supported by the support members 83A, 83B, and 83C made of metal having higher rigidity. On the other hand, the fixing attachment 84 is made of resin. Since the resin has higher flexibility for forming shape than that of metal, the fixing attachment 84 can be easily formed so that the angle at which the exposure unit 50 is fixed to the metal plate stay 75 can be changed, and that the fixing attachment 84 does not interfere with the support portions 831 of the support members 83A and 83B.

Figure 10:
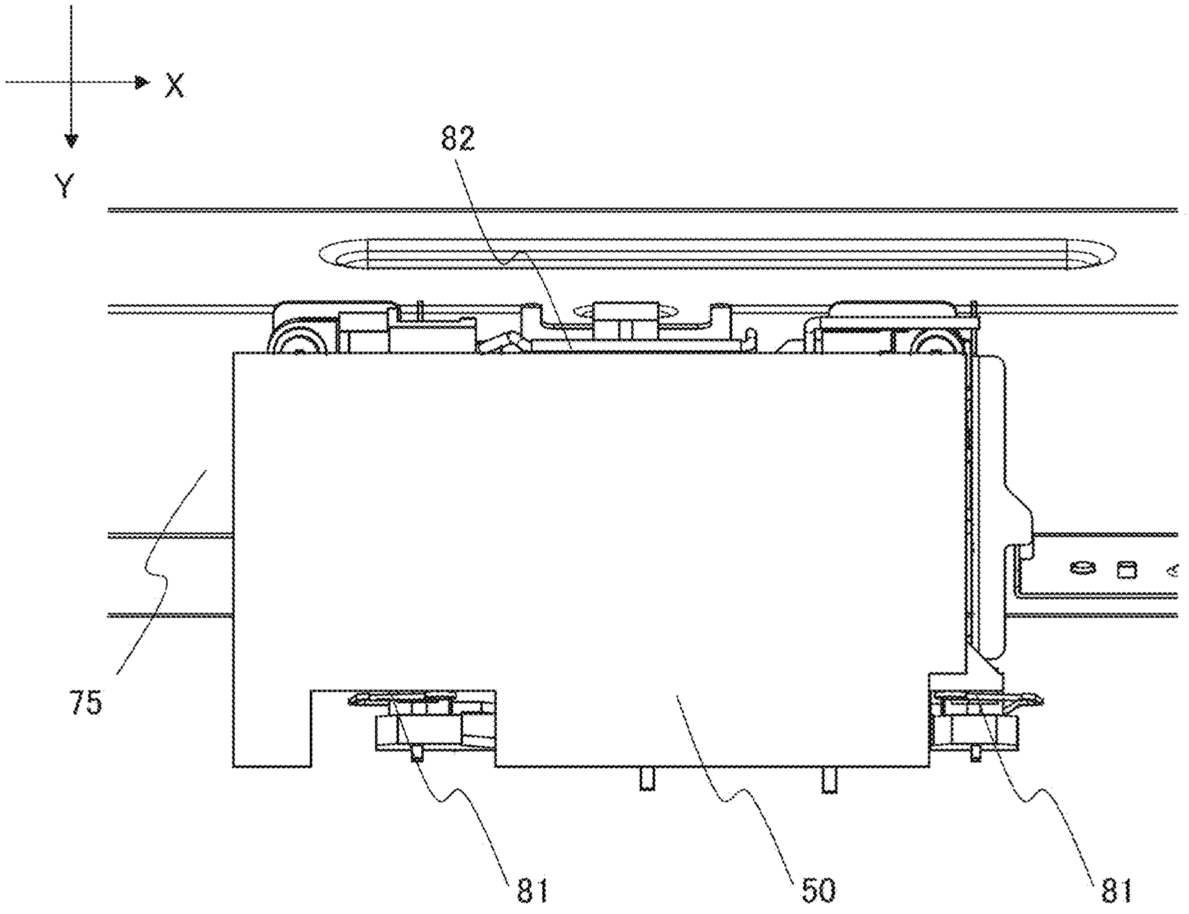
FIG. 10 is a top view illustrating the exposure unit fixed to the metal plate stay via the fixing attachment of the first embodiment.

As illustrated in FIG. 10, in a state where the exposure unit 50 is supported by the support members 83A, 83B, and 83C, the exposure unit 50 is urged by first wire springs 81 and a second wire spring 82, which serve as urging members. The first wire springs 81 are disposed at two positions on the front side. Specifically, one of the first wire springs 81 is disposed at a right position, and the other is disposed at a left position. The second wire spring 82, which is a single wire spring, is disposed at a position on the back side. The first wire springs 81 and the second wire spring 82 urge the exposure unit 50 toward the metal plate stay 75.

Figure 11A:
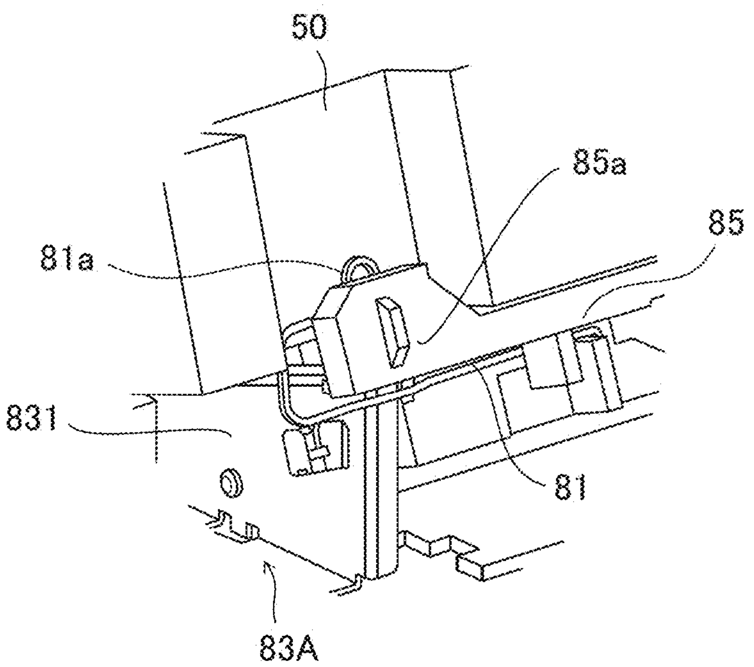
FIG. 11A is a perspective view which illustrates a first wire spring of the first embodiment, and in which a wire-spring holding member is illustrated.
Figure 11B:
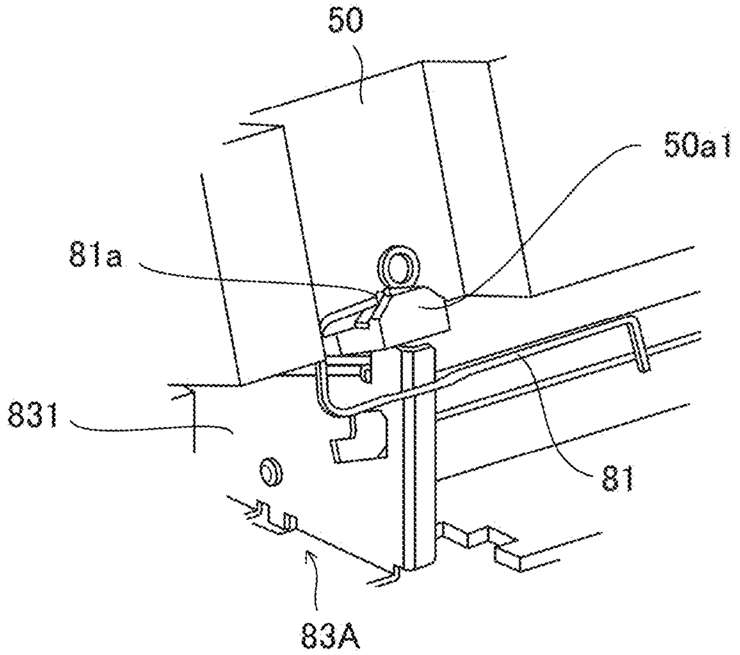
FIG. 11B is a perspective view which illustrates the first wire spring of the first embodiment, and in which the wire-spring holding member is not illustrated.

FIGS. 11A and 11B illustrate a first wire spring 81. Hereinafter, the first wire spring 81 that urges a left portion of the exposure unit 50 will be described as an example. In the present embodiment, the other first wire spring 81 that urges a right portion of the exposure unit 50 is disposed. However, since the first wire spring 81 that urges the right portion of the exposure unit 50 and the first wire spring 81 that urges the left portion of the exposure unit 50 have an identical structure, the first wire spring 81 that urges the left portion of the exposure unit 50 will be described below as an example.

As illustrated in FIGS. 11A and 11B, one end portion of the first wire spring 81 is connected to a wire-spring holding member 85, which is held between the first support member 83A and the second support member 83B (see FIG. 6). The other end portion of the first wire spring 81 is provided with a locking portion 81*a*. The locking portion 81*a* locks the first supported portion 50*al* of the exposure unit 50, and urges the exposure unit 50. Preferably, as illustrated in FIG. 11A, an abutment portion 85*a* that abuts against the leading end surface of the first supported portion 50*al* is formed in the wire-spring holding member 85 for preventing the locking portion 81*a* from being disengaged from the first supported portion 50*a*1.

Figure 12:
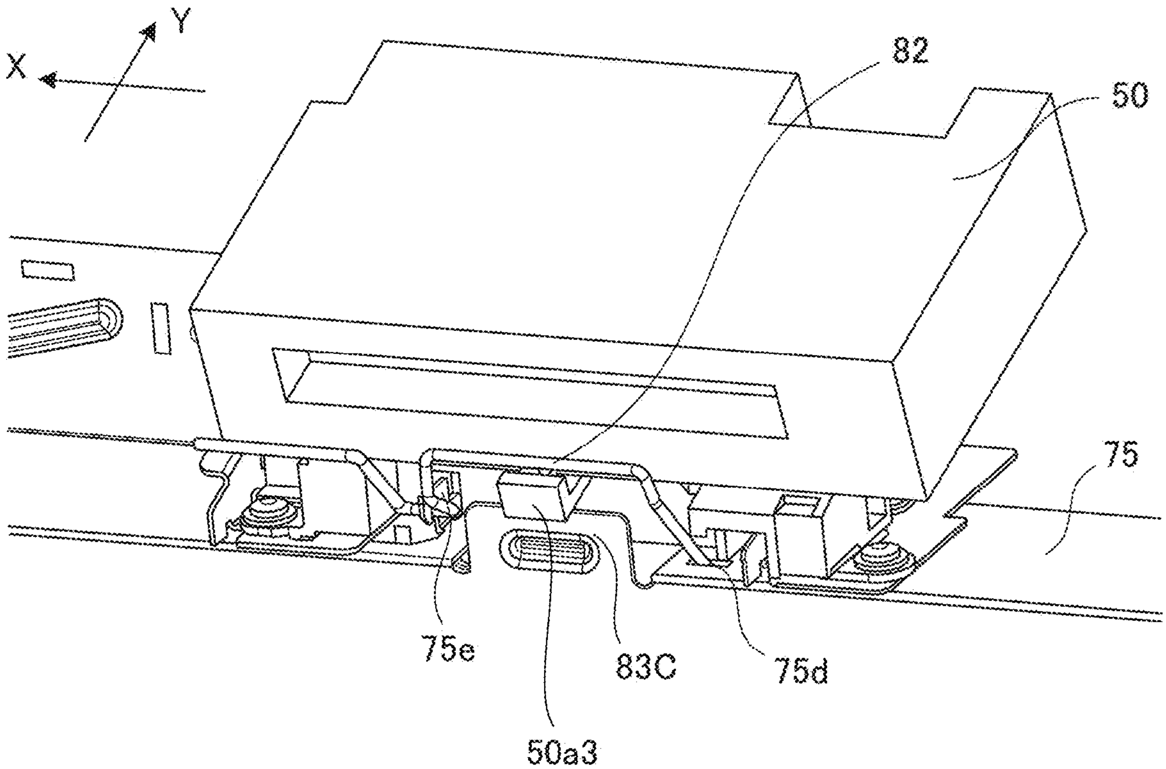
FIG. 12 is a perspective view for illustrating a second wire spring of the first embodiment.

FIG. 12 illustrates the second wire spring 82. As illustrated in FIG. 12, one end portion of the second wire spring 82 is connected to a fixing hole portion 75*d*, which is formed in the metal plate stay 75. The other end portion of the second wire spring 82 is detachably hooked on a hook portion 75*e*, which is formed on the metal plate stay 75. In a state where the other end portion of the second wire spring 82 is not hooked on the hook portion 75*e*, the second wire spring 82 can swing on the metal plate stay 75, with a portion of the second wire spring 82 on the fixing hole portion 75*d* side serving as a swing shaft. In a state where the other end portion of the second wire spring 82 is hooked on the hook portion 75*e*, the second wire spring 82 locks the third supported portion 50*a*3 of the exposure unit 50, and urges the exposure unit 50.

As described above, in the present embodiment, the supported members 50*al* to 50*a*3, via which the exposure unit 50 is supported by the support members 83A, 83B, and 83C, are urged by the first wire springs 81 and the second wire spring 82. There are two reasons for urging the exposure unit 50. The first reason is to stably support the exposure unit 50. The exposure unit 50 is supported by the support members 83A, 83B, and 83C alone, and is not fixed to the support members 83A, 83B, and 83C via screws or the like. Thus, if the exposure unit 50 is not urged, the exposure unit 50 might not be stably supported by the support members 83A, 83B, and 83C. Thus, for stably supporting the exposure unit 50, the exposure unit 50 is urged by the first wire springs 81 and the second wire spring 82 so that the abutted portions (i.e., the supported portions 50*al* to 50*a*3) of the exposure unit 50 are not separated from the support members 83A, 83B, and 83C.

The second reason is to increase the image quality. For example, even if the image forming apparatus 1 vibrates during an image forming operation due to the vibration around the image forming apparatus 1, the vibration hardly transmits to the exposure unit 50 because the exposure unit 50 is urged. In addition, even if the exposure unit 50 vibrates, the vibration will be decreased in a shorter time by the first wire springs 81 and the second wire spring 82. As a result, the vibration will less affect the image quality.

Figure 13:
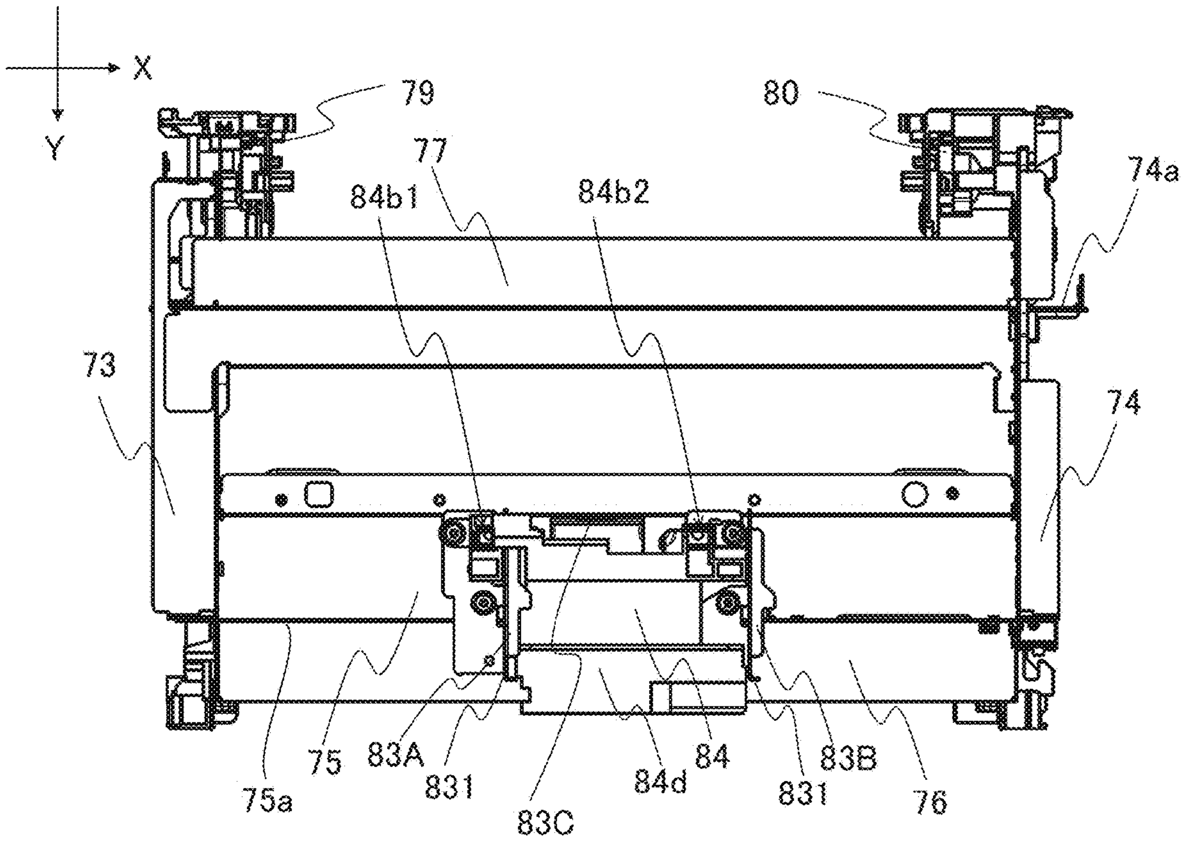
FIG. 13 is a top view for illustrating positions of the support members with respect to the metal plate stay of the first embodiment.
Figure 14:
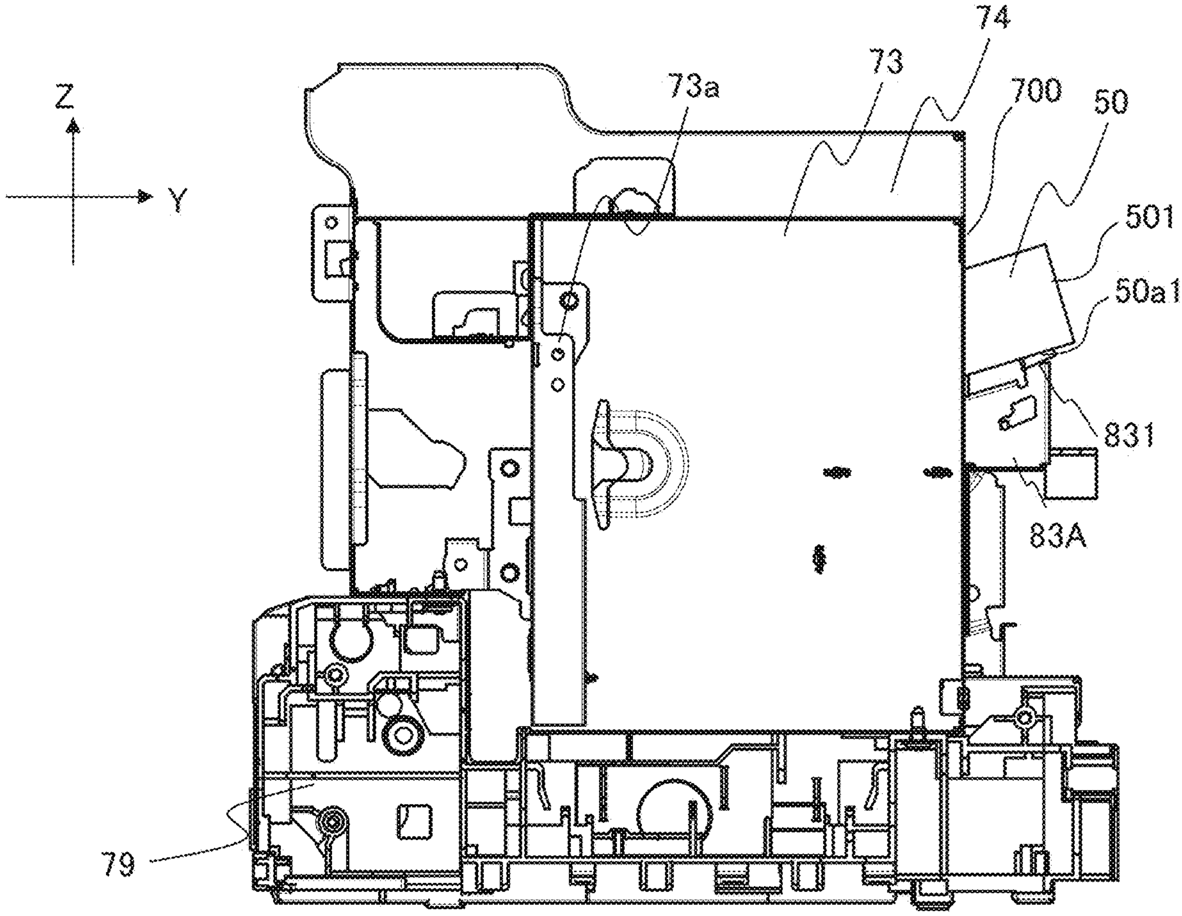
FIG. 14 is a left side view for illustrating a position of the exposure unit of the first embodiment.

In addition, in the present embodiment, as illustrated in FIG. 13, the first support member 83A and the second support member 83B (specifically, the support portion 831 of the first support member 83A and the support portion 831 of the second support member 83B) support the exposure unit 50 at positions upstream of an upstream edge portion 75*a* of the metal plate stay 75 in the emission direction of the laser beam from the exposure unit 50. As a result, as illustrated in FIG. 14, the exposure unit 50 is disposed such that when viewed in the width direction, an upstream edge portion 501 of the exposure unit 50 is located upstream of upstream edges 700 of the pair of the left side-plate frame 73 and the right side-plate frame 74, in the emission direction (opposite to the Y direction) of the laser beam.

Figure 15:
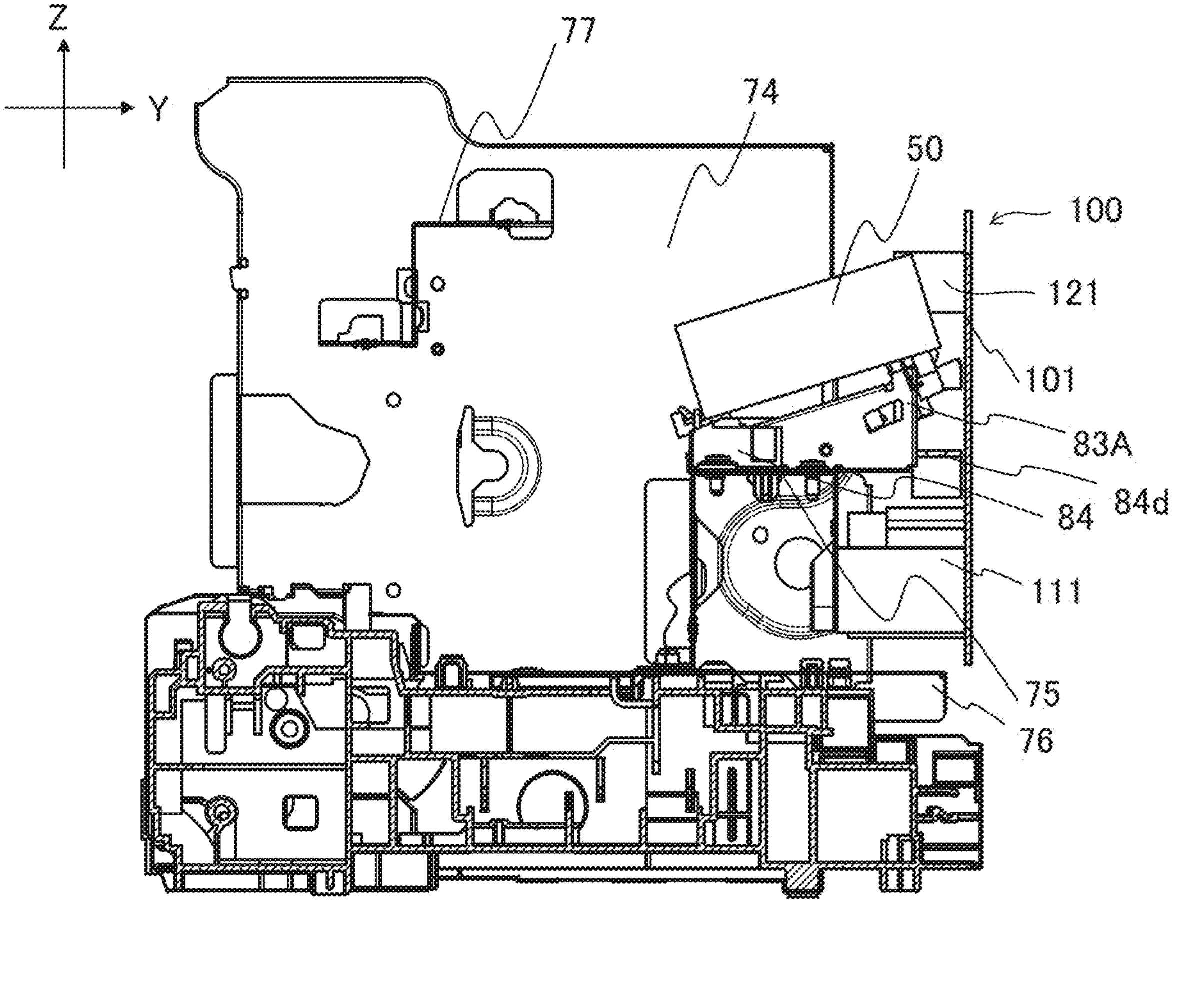
FIG. 15 is a cross-sectional view for illustrating the exposure unit of the first embodiment and electric components mounted on a circuit board.

In this manner, the exposure unit 50 is disposed such that one portion of the exposure unit 50 projects from the left side-plate frame 73 and the right side-plate frame 74 toward the front side. As a result, as illustrated in FIG. 15, a space can be produced below the exposure unit 50, and can be used. That is, the first support member 83A and the second support member 83B are used not only for reducing the vibration of the exposure unit 50 attached to the above-described fixing attachment 84, but also for ensuring the space produced below the exposure unit 50. In the present embodiment, the electric component 111, which is one of the components mounted on the circuit board 100, is disposed in the space produced below the exposure unit 50, so that the size of a portion of the body of the image forming apparatus 1 located on the front side can be reduced. The electric component 111 is, for example, a low-voltage power supply transformer, a heat sink, or an electrolytic capacitor; and is larger than other components in the Y direction. Thus, if the electric component 111 is disposed in the space produced below the exposure unit 50, the size of the whole of the apparatus can be reduced.

In addition, in the present embodiment, since the fixing attachment 84 is made of resin that has high flexibility for forming shape, the high flexibility for forming shape can be advantageously used. For example, as illustrated in FIG. 15, a heat blocking wall 84*d* may be formed in the fixing attachment 84, on the front side. The heat blocking wall 84*d* is formed for blocking the heat generated from the electric component 111 mounted on the circuit board 100, from transmitting to the exposure unit 50. The heat blocking wall 84*d* extends in a substantially horizontal direction, and is disposed between the exposure unit 50 and the electric component 111 in the vertical direction (i.e., gravity direction). The temperature of the exposure unit 50 is increased also by self temperature rise. Thus, if the exposure unit 50 does not receive heat from other components, it is advantageous for thermally controlling the exposure unit 50. The heat blocking wall 84*d* is formed integrally with the fixing attachment 84, as illustrated in FIG. 8. As a result, the number of components can be reduced, and the heat blocking wall 84*d* can be formed in an optimum shape, at an optimum position in accordance with the arrangement of the circuit board 100.

Note that in the present embodiment, the direction (i.e., the first direction) of the shaft portions of the first boss portions 50*b*1 and 50*b*2 of the exposure unit 50 is the same as the direction (i.e., the first direction) of the first fixing hole portions 75*c*1 and 75*c*2 of the metal plate stay 75. That is, the first boss portions 50*b*1 and 50*b*2 can fit in the first fixing hole portions 75*c*1 and 75*c*2. Thus, in accordance with the type of an image forming apparatus, the exposure unit 50 may be directly fixed to the metal plate stay 75, not via the fixing attachment 84.

As described above, in the present embodiment, the exposure unit 50 is fixed to the metal plate stay 75 in a state where the exposure unit 50 is attached to the fixing attachment 84. In addition, the exposure unit 50 is supported by the support members 83A, 83B, and 83C, which are disposed on the metal plate stay 75. The fixing attachment 84 is made of resin, and the support members 83A, 83B, and 83C are made of metal or the like whose rigidity is higher than that of the fixing attachment 84. The exposure unit 50 attached to the fixing attachment 84 is positioned such that the exposure unit 50 is inclined with respect to the surface 751 of the metal plate stay 75 so that the emission angle of the laser beam emitted from the exposure unit 50 to the photosensitive drum 11 is a predetermined angle. That is, the position of the exposure unit 50 can be changed by changing the fixing attachment 84 (to which the exposure unit 50 is attached), without changing the shape of the exposure unit 50. In this case, since the exposure unit 50 is supported by the support members 83A, 83B, and 83C having higher rigidity, the vibration of the exposure unit 50 attached to the fixing attachment 84 can be reduced. Thus, in the present embodiment, the exposure unit and the metal plate stay can be used for many types of image forming apparatuses, without a plurality of types of exposure units and metal plate stays in which the direction of shaft portions of bosses and the direction of boss holes are varied. As a result, the cost can be reduced.

In a comparative example to the present embodiment, for fixing an exposure unit to a metal plate stay in assembling an image forming apparatus, bosses with shaft portions are formed on one of the exposure unit and the metal plate stay, and boss holes in which the bosses can fit are formed in the other. The bosses and the boss holes are formed such that the direction of the shaft portions of the bosses is the same as the direction of the boss holes so that the emission angle of the laser beam emitted from the exposure unit to the photosensitive drum is a predetermined angle in a state where the exposure unit is fixed to the metal plate stay.

In the comparative example, the exposure unit is fixed to the metal plate stay at an appropriate position such that the emission angle of the laser beam is a predetermined angle, via the bosses and boss holes formed in advance in or on the exposure unit and the metal plate stay. However, the positional relationship between the exposure unit and the photosensitive drum in the body of the image forming apparatus may vary, depending on a type of the image forming apparatus or an error produced in the manufacturing. In such a case, in the comparative example, a plurality of types of exposure units and metal plate stays having different directions of shaft portions of the bosses and boss holes may have to be prepared in advance for appropriately disposing the exposure unit. That is, since an exposure unit and a metal plate stay cannot be used for a plurality of types of image forming apparatuses, the configuration in the comparative example is costly.

In the present embodiment, however, since an exposure unit and a metal plate stay can be used for a plurality of types of image forming apparatuses as described above, the cost can be reduced.

In the above-described embodiment, the second fixing hole portions **84*b*1 and 84*b*2 are formed in the first side of the fixing attachment 84, and the second boss portions 84*c*1 and 84*c*2 are formed on the second side of the fixing attachment 84, as an example (see FIG. 8). However, the present disclosure is not limited to this. For example, the boss portions may be formed on the first side, and the fixing hole portions may be formed in the second side. In this case, the exposure unit 50 is provided with hole portions in which the boss portions formed on the first side fit, and the metal plate stay 75 is provided with boss portions which fit in the fixing hole portions formed in the second side. However, in a case where the boss portions are fitted in the exposure unit 50, the boss portions may have to be fitted in the exposure unit 50 such that the boss portions do not interfere with a laser oscillator, a polygon mirror, a lens, a scanner motor, and the like disposed in the exposure unit 50. Thus, the size of the exposure unit 50 may be increased. In a case where the boss portions are formed on the metal plate stay 75, machining the boss portions may be more difficult than boring holes, and the assembling the image forming apparatus 1 may become difficult because the boss portions obstruct the assembling. For these reasons, it is preferable, as described above, that the boss portions be formed on the exposure unit 50, that the fixing hole portions be formed in the metal plate stay 75, that the second fixing hole portions 84*b*1 and 84*b*2 be formed in the fixing attachment 84 so that the boss portions fit in the second fixing hole portions 84*b*1 and 84*b*2, and that the second boss portions 84*c*1 and 84*c*2 be formed on the fixing attachment 84** so as to fit in the fixing hole portions.

Note that in the present embodiment, the position of the exposure unit 50 with respect to the metal plate stay 75 in the width direction can be easily changed by replacing the fixing attachment 84 with another fixing attachment. That is, a plurality of types of fixing attachments 84 are prepared, in which the positional relationship between the second fixing hole portions **84*b*1 and 84*b*2 formed in the first side and the second boss portions 84*c*1 and 84*c*2 formed on the second side varies in the width direction. In this case, when the image forming apparatus 1 is assembled, an appropriate fixing attachment 84 can be selected and used. In this manner, the position of the exposure unit 50 with respect to the metal plate stay 75** in the width direction can be easily changed.

In the present embodiment, each of the first support member 83A, the second support member 83B, and the fixing attachment 84 is in contact with the metal plate stay 75, and is fixed to the metal plate stay 75. However, the present disclosure is not limited to this. For example, the fixing attachment 84 may be fixed to the first support member 83A and the second support member 83B, and only the first support member 83A and the second support member 83B may be in contact with the metal plate stay 75 and fixed to the metal plate stay 75. In another case, the first support member 83A and the second support member 83B may be fixed to the fixing attachment 84, and only the fixing attachment 84 may be in contact with the metal plate stay 75 and fixed to the metal plate stay 75. In the present embodiment, each of the first support member 83A, the second support member 83B, and the fixing attachment 84 is fixed to the metal plate stay 75. Thus, each of the first support member 83A, the second support member 83B, and the fixing attachment 84 can be positioned with respect to the metal plate stay 75 at high accuracy, without being affected by the tolerance of a component interposed between the metal plate stay 75 and the first support member 83A, the second support member 83B, or the fixing attachment 84. Thus, although the configuration in which the first support member 83A, the second support member 83B, and the fixing attachment 84 are supported by the metal plate stay 75 can be flexibly designed to some extent, the configuration of the present embodiment is preferably used in consideration of the component tolerance, for more accurately supporting the exposure unit 50.

Second Embodiment

Overall Configuration of Image Forming Apparatus

Next, an overall configuration of an image forming apparatus 1 of a second embodiment will be described. Hereinafter, a component given a reference symbol identical to a reference symbol of a component of the first embodiment has the same structure and effect as those of the component of the first embodiment, unless otherwise specified. In addition, the present embodiment and the first embodiment can be embodied in one image forming apparatus at the same time.

In the field of image forming apparatuses, it has been desired to further reduce the size and weight of the image forming apparatuses. For reducing the size and weight of an image forming apparatus, a component, such as a metal plate, that constitutes a frame of the image forming apparatus may be able to be downsized. However, if such a component is downsized, the rigidity of the frame may be decreased. As a result, the frame may be displaced or vibrate when an image forming operation is performed on a recording material, possibly deteriorating the quality of an image formed on the recording material.

In addition, an electronic component, such as a motor, generates electromagnetic wave. If the area of a metal plate that covers the motor is reduced for reducing the size and weight of an image forming apparatus, more electromagnetic noise may be radiated toward the outside of the image forming apparatus. Since the electromagnetic noise may affect electronic apparatuses placed around the image forming apparatus, it is desired to reduce the electromagnetic noise to be radiated toward the outside, as much as possible.

For these reasons, the present embodiment proposes a configuration of frames of an image forming apparatus that allows the image forming apparatus to be downsized, that causes the frames to have high rigidity, and that reduces the electromagnetic noise to be radiated toward the outside.

Figure 16:
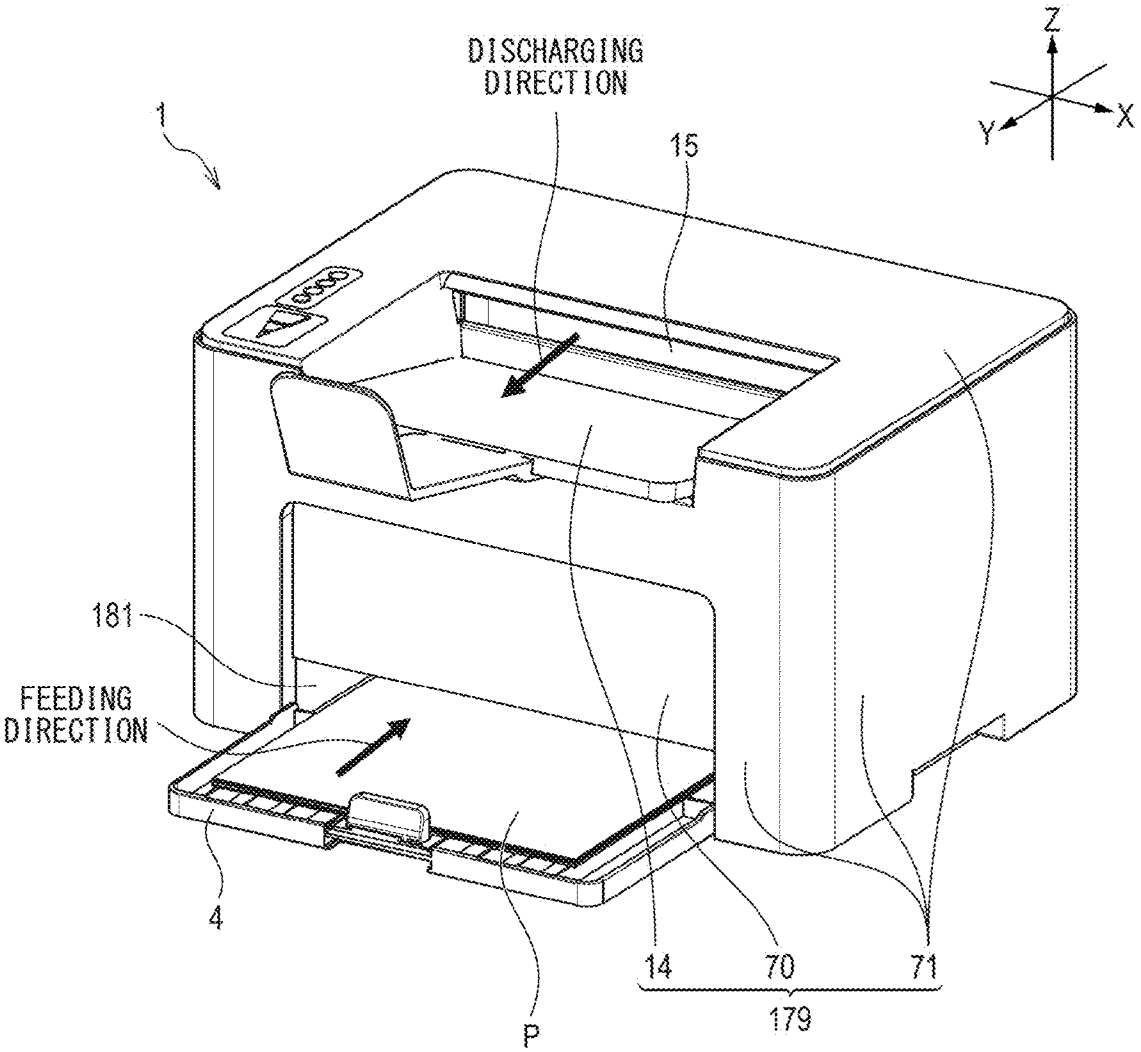
FIG. 16 is a perspective view of an image forming apparatus of a second embodiment.
Figure 17:
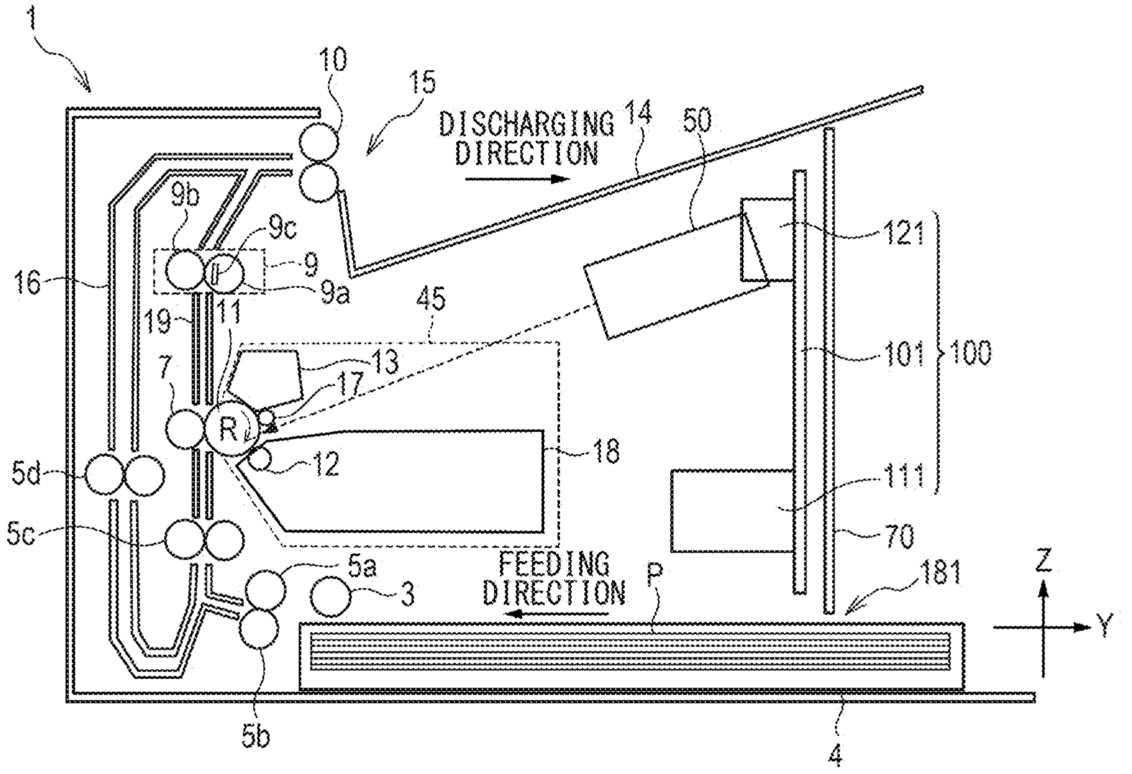
FIG. 17 is a cross-sectional view of the image forming apparatus of the second embodiment.

FIG. 16 is a perspective view of an image forming apparatus 1 of the present embodiment. FIG. 17 illustrates an internal configuration of the image forming apparatus 1 of the present embodiment, viewed from the X direction (i.e., the rotation-axis direction of the photosensitive drum 11).

In FIG. 16, a front cover 70 is disposed in one portion of an end face (i.e., one portion of a front face) of the image forming apparatus 1 (the end face is located downstream in the discharging direction), and covers a below-described circuit board 100. In addition, an exterior cover 71 is disposed on one portion (other than the portion on which the front cover 70 is disposed) of the front face, side faces, and a top face of the image forming apparatus 1. The front cover 70, the exterior cover 71, and the above-described discharging tray 14 constitute a housing 179 of the image forming apparatus 1. In addition, a back cover (not illustrated) is disposed on the back side of the image forming apparatus 1. The back cover also serves as one portion of the housing 179. Note that the housing 179 is a member that covers the whole of the image forming apparatus 1, and contains components including a below-described exposure unit (optical box) 50. The above-described feeding inlet 181 and discharging outlet 15 are opening portions formed in one portion of the housing 179. The recording material P is inserted into the interior of the image forming apparatus 1 through the feeding inlet 181, and is discharged to the outside of the image forming apparatus 1 through the discharging outlet 15.

Next, a flow of image forming operations performed on the recording material P will be described. The image forming operations are performed mainly by an image forming unit 45 (i.e., a photosensitive drum 11, a charging roller 17, a developing roller 12, and a developer container 18), the exposure unit 50, a transfer unit 7 (transfer roller 7*a*), and a fixing portion 9. When image information data is sent to the image forming apparatus 1, the photosensitive drum 11 that is a rotatable image-bearing member is driven and rotated, depending on a print start signal, toward a direction indicated by an arrow R, at a predetermined circumferential speed (process speed). The exposure unit 50 emits a laser beam toward the photosensitive drum 11, in accordance with the image information data received by the image forming apparatus 1. The exposure unit 50 is a box-shaped unit that contains members including a laser oscillator that outputs the laser beam, a polygon mirror and a lens that are used for emitting the laser beam toward the photosensitive drum 11, and a scanner motor that rotates the polygon mirror. The photosensitive drum 11 is charged in advance by the charging roller 17. When the photosensitive drum 11 is irradiated with the laser beam, an electrostatic latent image is formed on the photosensitive drum 11. Then the toner contained in the developer container (storage portion) 18 is conveyed to the photosensitive drum 11 by the developing roller 12, so that the electrostatic latent image is developed into a toner image on the photosensitive drum 11.

In parallel with the above-described image forming process, the recording material P is fed from a cassette 4. On a conveyance path 19 of the image forming apparatus 1, a pickup roller 3, a feed roller 5*a*, and a conveyance roller pair 5*c* are disposed. The pickup roller (feeding member) 3 contacts the uppermost sheet of the recording material P stored in the cassette 4, and feeds the recording material P toward the feeding direction (i.e., the negative side in the Y direction) by the rotation of the pickup roller 3 itself. The feed roller 5*a* and a separation roller 5*b* that is in pressure contact with the feed roller 5*a* form a separation nip. If a plurality of recording materials P is fed to the separation nip due to the frictional force of the recording materials P, the feed roller 5*a* and the separation roller 5*b* separate one of the plurality of recording materials P from the other, and feed only the uppermost sheet toward the downstream side.

The recording material P fed from the cassette 4 is conveyed by the conveyance roller pair 5*c* toward the transfer roller 7 through the conveyance path 19. The toner image formed on the photosensitive drum 11 is transferred onto the recording material P by a voltage transfer bias being applied to the transfer roller 7. The recording material Ponto which the toner image has been transferred by the transfer roller 7 is heated and pressed by the fixing portion (fixing apparatus) 9, so that the toner image is fixed to the recording material P. The fixing portion 9 includes a heating roller 9*a* that includes a fixing heater 9*c*, and a pressing roller 9*b* that is urged toward the heating roller 9*a*. The recording material P to which the toner image has been fixed is then discharged to the discharging tray 14 by the discharging roller pair 10.

If images are to be formed on both sides of the recording material P, the recording material P having an image formed on a first surface thereof is switch-backed by the discharging roller pair 10, and is guided to a duplex conveyance path 16. The recording material P having been guided to the duplex conveyance path 16 is conveyed again toward the transfer roller 7 by a duplex-conveyance roller pair 5*d*. After an image is formed on a second surface of the recording material P by the transfer roller 7, the recording material P is discharged to the outside of the image forming apparatus 1 by the discharging roller pair 10. The toner left on the photosensitive drum 11 after a toner image is transferred onto the recording material P is removed by a cleaning unit 13.

As illustrated in FIG. 17, the image forming apparatus 1 includes a circuit board 100. The circuit board 100 includes a printed board 101 made of insulator, and a group of electronic components (including electric components 111 and 121) that are soldered to the printed board 101. Since a conductor pattern is formed in and on the printed board 101, the group of electronic components including the electric components (111 and 121) are electrically connected with each other. On the circuit board 100, a converter circuit (not illustrated) is mounted. The converter circuit rectifies a voltage supplied from the outside of the image forming apparatus 1, and converts a voltage for obtaining a predetermined voltage required for the image forming process.

As illustrated in FIG. 17, the circuit board 100 is disposed such that the discharging direction intersects a surface of the printed board 101 on which the group of electronic components including the electric components (111 and 121) is mounted. In addition, the printed board 101 is disposed between the front cover 70 and the exposure unit 50 in the discharging direction. The group of electronic components including the electric components (111 and 121) is mounted on the surface of the printed board 101 that faces the exposure unit 50.

Configuration of Frames

Figure 18:
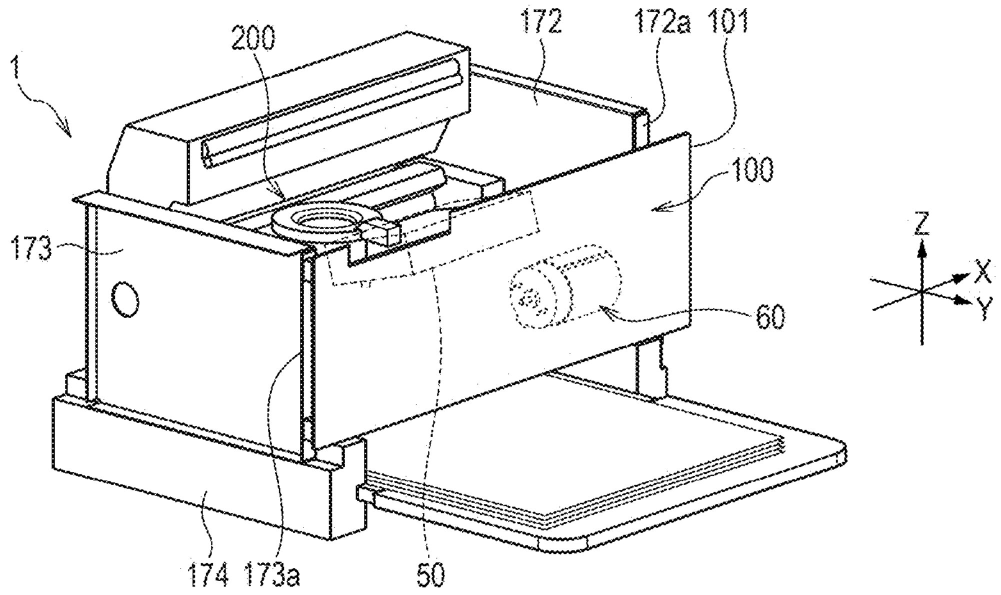
FIG. 18 is a perspective view illustrating configuration of frames and a position of a board of the second embodiment.
Figure 19:
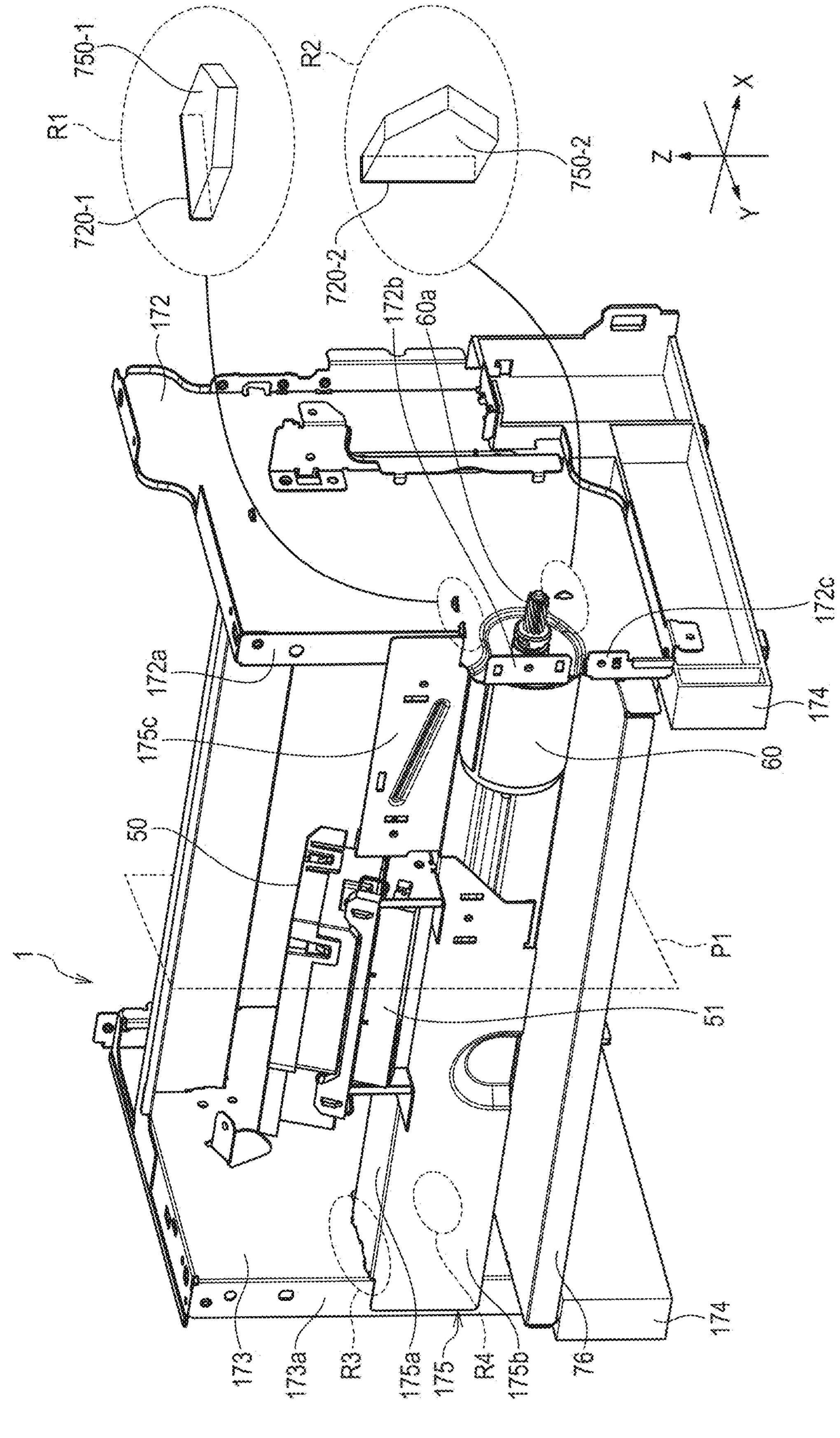
FIG. 19 is a perspective view illustrating the configuration of frames of the second embodiment.
Figure 20:
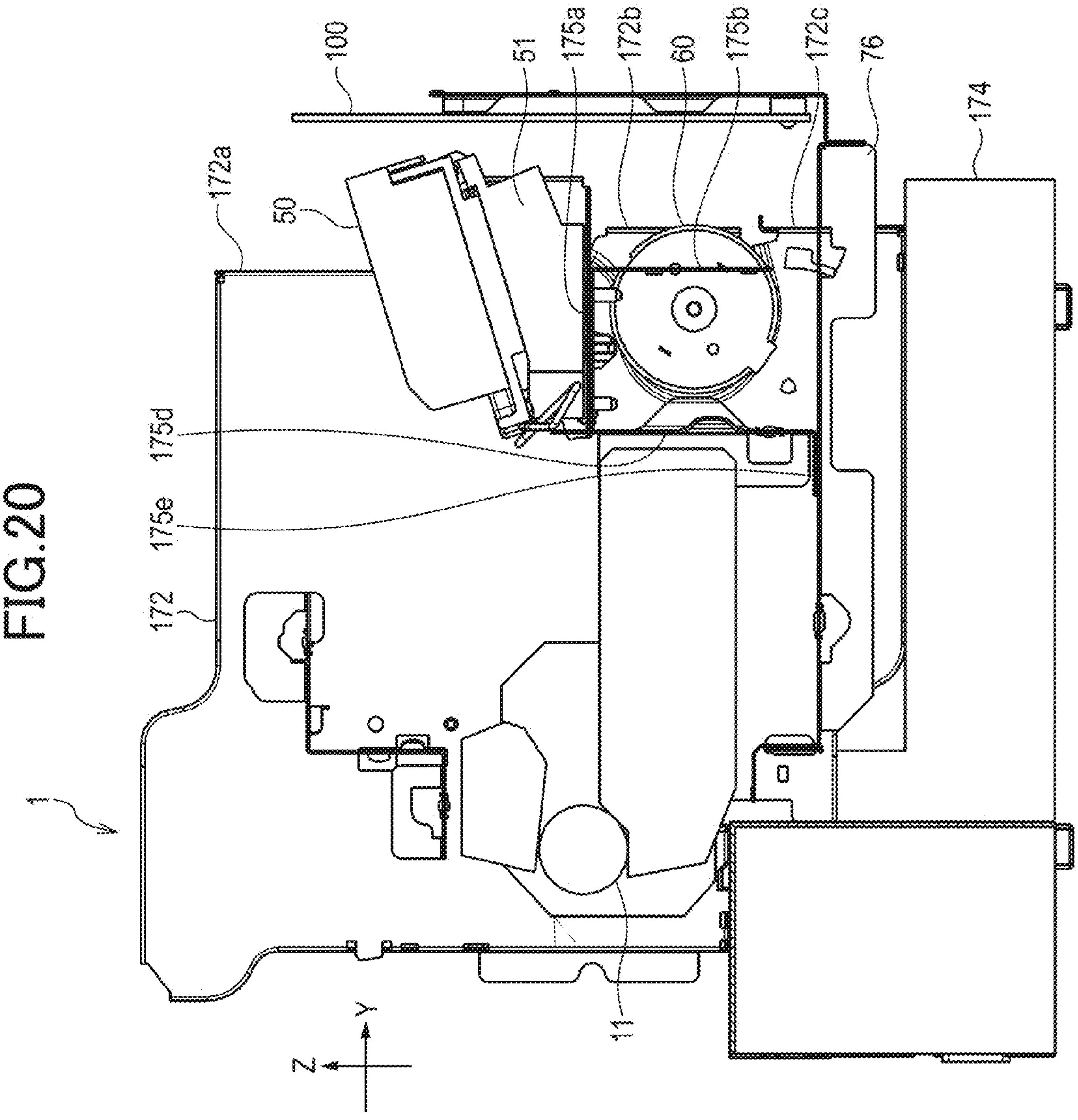
FIG. 20 is a cross-sectional view illustrating the configuration of frames of the second embodiment.

With reference to FIGS. 18 to 20, a configuration of frames of the image forming apparatus 1 will be described in detail. FIG. 18 is a perspective view of the image forming apparatus 1 that includes the circuit board 100. In FIG. 18, the front cover 70 and the exterior cover 71, illustrated in FIG. 16, are not illustrated. Note that in FIG. 18, a supply portion 200 for supplying toner, not illustrated in FIG. 16, is illustrated. In the present embodiment, a user or a serviceman can attach a supply container (not illustrated) to the supply portion 200 of the image forming apparatus 1 for supplying the developer to the image forming apparatus 1 through the supply portion 200. The supply portion 200 is connected to the developer container (storage portion) 18 in the image forming apparatus 1. Note that a user or a serviceman can access the supply portion 200 by opening the discharging tray 14 upward.

As illustrated in FIG. 18, the circuit board 100 is disposed on the front side, and on the back side (i.e., the negative side in the Y direction) of the circuit board 100, the exposure unit 50 and the driving motor 60 are disposed. Note that since the exposure unit 50 and the driving motor 60, located as illustrated in FIG. 18, cannot actually be seen by a user, the exposure unit 50 and the driving motor 60 are illustrated with dotted lines in FIG. 18.

The above-described photosensitive drum 11, the charging roller 17, the developing roller 12, the pickup roller 3, the feed roller 5*a*, the conveyance roller pair 5*c*, the transfer roller 7, the pressing roller 9*b*, and the discharging roller pair 10 are driven and rotated by the single driving motor 60. The driving force from the driving motor 60 is transmitted to process members and conveyance members via a gear train (not illustrated) disposed on the right side-plate frame 172.

Since the driving motor 60 drives many members of the image forming apparatus 1 as described above, high load is applied to the motor shaft. In the present embodiment, the driving motor 60 is a DC brush motor because the DC brush motor is inexpensive and can drive and rotate the high load.

The DC brush motor rotates when current flows continuously through a coil. The current flows while a motor brush contacts commutators separated from each other in the rotational direction. However, the DC brush motor has a characteristic of producing sparks and radiating electromagnetic noise in a radio-frequency band when the motor brush starts contacting a commutator. The electromagnetic noise in the radio-frequency band may cause an audio apparatus to produce a noise, and may cause malfunction of a measuring instrument. Thus, since the electromagnetic noise may interfere with the operation of apparatuses disposed around the image forming apparatus 1, it is desired to prevent the radio-frequency-band electromagnetic noise from leaking to the outside.

FIG. 19 is a perspective view illustrating a configuration of frames of the image forming apparatus 1 in a state where the circuit board 100 is removed from the image forming apparatus 1. As illustrated in FIG. 19, the image forming apparatus 1 includes a right side-plate frame (first metal plate) 172, a left side-plate frame (second metal plate) 173, base frames 174, a bridging frame (frame member, metal plate stay) 175, and a lower frame 76. The right side-plate frame 172 supports an end portion (first end portion) of the photosensitive drum 11 located on the right side in the X direction, and the left side-plate frame 173 supports an end portion (second end portion) of the photosensitive drum 11 located on the left side in the X direction. The base frames 174 are disposed on a bottom surface of the image forming apparatus 1, and support the right side-plate frame 172 and the left side-plate frame 173 from below. The lower frame 76 is disposed between the right side-plate frame 172 and the left side-plate frame 173, and extends substantially in an XY plane, toward the back side. Note that the right side-plate frame 172, the left side-plate frame 173, the bridging frame 175, and the lower frame 76 are made of metal, and the base frames 174 are made of resin.

At an edge portion of the right side-plate frame 172 in the Y direction, a bent portion 172*a* is formed for reinforcing the right side-plate frame 172. Similarly, at an edge portion of the left side-plate frame 173 in the Y direction, a bent portion 173*a* is formed for reinforcing the left side-plate frame 173. The bent portion 172*a* is bent toward the positive side in the X direction so as to be substantially parallel with an XZ plane, and the bent portion 173*a* is bent toward the negative side in the X direction so as to be substantially parallel with an XZ plane.

The bridging frame 175 is disposed between the right side-plate frame 172 and the left side-plate frame 173 in the X direction, and supports the exposure unit 50 via a support base 51. The bridging frame 175 includes a support surface 175*a*, a reinforcing surface 175*b*, and a reinforcing surface 175*c*. The support surface 175*a* supports the exposure unit 50. The reinforcing surface 175*b* is formed by bending the support surface 175*a* downward on the front side. The reinforcing surface 175*c* is formed by bending the support surface 175*a* upward on the front side. The support surface 175*a* extends substantially in an XY plane, and the reinforcing surfaces 175*b* and 175*c* extend substantially in an XZ plane.

When viewed from the front side, the reinforcing surface 175*b* of the bridging frame 175 overlaps with one portion of the bent portion 173*a* of the left side-plate frame 173. The back side of the reinforcing surface 175*b* is welded to the bent portion 173*a*, so that the bridging frame 175 and left side-plate frame 173 are connected with each other. In addition, when viewed from the front side, the reinforcing surface 175*c* of the bridging frame 175 overlaps with one portion of the bent portion 172*a* of the right side-plate frame 172. The back side of the reinforcing surface 175*c* is welded to the bent portion 172*a*, so that the bridging frame 175 and right side-plate frame 172 are connected with each other.

In addition, in an area R1, the support surface 175*a* of the bridging frame 175 is connected with the right side-plate frame 172. An end portion of the support surface 175*a* on the positive side in the X direction is provided with a plurality of projection portions 750-1, which fits in opening portions 720-1 formed in the right side-plate frame 172. In FIG. 19, since one portion of the opening portions 720-1 cannot actually be seen, the portion is illustrated with dotted lines. In addition, in an area R3, the support surface 175*a* of the bridging frame 175 is connected with the left side-plate frame 173. An end portion of the support surface 175*a* on the negative side in the X direction is provided with projection portions (not illustrated) similar to the projection portions 750-1. The projection portions (not illustrated) fit in opening portions (not illustrated) formed in the left side-plate frame 173.

As will be specifically described below, the bridging frame 175 also includes a reinforcing surface 175*d* (not illustrated in FIG. 19) in addition to the support surface 175*a*, the reinforcing surface 175*b*, and the reinforcing surface 175*c*. The reinforcing surface 175*d* is formed by bending the support surface 175*a* downward on the back side. In an area R2, the reinforcing surface 175*d* of the bridging frame 175 is connected with the right side-plate frame 172. An end portion of the reinforcing surface 175*d* on the positive side in the X direction is provided with a projection portion 750-2, which fits in an opening portion 720-2 formed in the right side-plate frame 172. In FIG. 19, since one portion of the opening portion 720-2 cannot actually be seen, the portion is illustrated with dotted lines. In an area R4, the reinforcing surface 175*d* of the bridging frame 175 is connected with the left side-plate frame 173. An end portion of the reinforcing surface 175*d* on the negative side in the X direction is provided with a projection portion (not illustrated) similar to the projection portion 750-2. The projection portion (not illustrated) fits in an opening portion (not illustrated) formed in the left side-plate frame 173.

The driving motor 60 is disposed on the right side-plate frame 172, and is disposed between the right side-plate frame 172 and the left side-plate frame 173 in the X direction. A rotary shaft 60*a* of the driving motor 60 passes through the right side-plate frame 172, and is exposed to the positive side in the X direction. The right side-plate frame 172 includes bent portions 172*b* and 172*c*, in addition to the above-described bent portion 172*a*. The bent portions 172*b* and 172*c* are located closer to the front side than the bent portion 172*a* is.

FIG. 20 is a cross-sectional view obtained by cutting the image forming apparatus 1 in a YZ plane, at a position at which the exposure unit 50 is disposed. That is, FIG. 20 is a cross-sectional view in which a cross section P1 of the image forming apparatus 1 illustrated in FIG. 19 is seen in the X direction (i.e., the rotation-axis direction of the photosensitive drum 11). Note that since FIG. 20 is a diagram in which the cross section P1 is seen in the X direction from the negative side toward the positive side, the left side-plate frame 173 is not illustrated in FIG. 20.

As illustrated in FIG. 20, the driving motor 60 is positioned, in the image forming apparatus 1, on the front side of the photosensitive drum 11 and on the back side of the circuit board 100 in the front-and-back direction. Thus, the position of the driving motor 60 is determined, depending on the positions of the two components (i.e., the photosensitive drum 11 and the circuit board 100). In addition, one portion of the driving motor 60 projects frontward from the bent portion 172*a* of the right side-plate frame 172. Thus, the bent portion 172*a* formed for reinforcing the right side-plate frame 172 cannot be formed in the vicinity of the driving motor 60. For this reason, the bent portion 172*a* is formed in only an area above the driving motor 60.

As described previously, the bent portion 172*a* is formed for reinforcing the right side-plate frame 172. Thus, a portion of the right side-plate frame 172 to which the driving motor 60 is fixed (i.e., a portion or sitting surface to which the driving motor 60 is fixed) has less rigidity than that of the other portion of the right side-plate frame 172.

As illustrated in FIG. 20, the driving motor 60 is positioned in the image forming apparatus 1, lower than the support surface 175*a* of the bridging frame 175 and higher than the lower frame 76 in the up-and-down direction.

The driving motor 60 includes the rotary shaft 60*a* (illustrated in FIG. 19), and a pinion gear (not illustrated) is attached to the rotary shaft 60*a*. The pinion gear is engaged with another gear, and receives force in the radial direction of the rotary shaft 60*a*. Thus, if the portion to which the driving motor 60 is fixed has less rigidity, the portion to which the driving motor 60 is fixed will be deformed by the driving force of the driving motor 60. If the portion to which the driving motor 60 is fixed is deformed and the posture of the driving motor 60 fixed to the portion is changed, the engagement between the rotary shaft 60*a* and the pinion gear deteriorates and causes uneven rotational speed. As a result, an image defect, such as change in density produced at certain intervals, will be produced in an image formed on the recording material P. That is, if the portion to which the driving motor 60 is fixed has less rigidity, the image quality may deteriorate.

For preventing the driving motor 60 from projecting from the bent portion 172*a* of the right side-plate frame 172, the size of the right side-plate frame 172 could be increased. However, if the size of the right side-plate frame 172 is increased, the cost and weight of the image forming apparatus 1 may be increased disadvantageously.

As described with reference to FIG. 19, the bridging frame 175 includes the reinforcing surface 175*b* and the reinforcing surface 175*c*, which are formed by bending the support surface 175*a* on the front side. The reinforcing surface 175*b* is formed by bending the support surface 175*a* downward, and the reinforcing surface 175*c* is formed by bending the support surface 175*a* upward. Note that if the whole of the support surface 175*a* from one end to the other end thereof in the X direction is bent upward, one portion of the bridging frame 175 may interfere with the exposure unit 50. In addition, if the whole of the support surface 175*a* from one end to the other end thereof in the X direction is bent downward, one portion of the bridging frame 175 may interfere with the driving motor 60.

As illustrated in FIG. 20, when viewed in the X direction, the reinforcing surface 175*b* overlaps with one portion of the driving motor 60, that is, the reinforcing surface 175*b* partially overlaps the driving motor. Thus, it can be understood again that one portion of the bridging frame 175 may interfere with the driving motor 60 if the whole of the support surface 175*a* is bent downward. Even if the whole of the support surface 175*a* is bent downward and the one portion of the bridging frame 175 can be prevented from interfering with the driving motor 60, the bridging frame 175 will cover the driving motor 60 on the front side, and after the bridging frame 175 is welded to the right side-plate frame 172 and the left side-plate frame 173, the driving motor 60 cannot be detached from and attached to the right side-plate frame 172. Thus, the ease of assembly and the ease of replacement in servicing may be deteriorated significantly.

For such a reason, in an area in which the driving motor 60 is not disposed in the X direction, the reinforcing surface 175*b* is formed by bending the support surface 175*a* downward, and in an area in which the driving motor 60 is disposed in the X direction, the reinforcing surface 175*c* is formed by bending the support surface 175*a* upward. Thus, the bent portions (i.e., the reinforcing surfaces 175*b* and 175*c*) of the bridging frame 175 formed by bending the support surface 175*a* are formed not continuously with each other. As a result, the rigidity of the bent portions is made lower than the rigidity of bent portions that are formed continuously with each other. The portion of the bridging frame 175 in which the bent portions are formed not continuously with each other is in the vicinity of the exposure unit 50. Thus, if the rigidity of the portion decreases, it may become difficult for the bridging frame 175 to stably support the exposure unit 50.

As described above, the bridging frame 175 includes the reinforcing surface 175*d* formed by bending the support surface 175*a* downward on the back side. The reinforcing surface 175*d* extends substantially in an XZ plane, and is disposed between the photosensitive drum 11 and the driving motor 60 in the Y direction. That is, as illustrated in FIG. 20, the bridging frame 175, constituted by the support surface 175*a*, the reinforcing surface 175*b*, and the reinforcing surface 175*d*, is substantially U-shaped. Note that since the reinforcing surface 175*c* is located at a position at which the reinforcing surface 175c is not seen, in FIG. 20, because of the exposure unit 50, the reinforcing surface 175c is not illustrated in FIG. 20. The bridging frame 175 also includes a fixing surface 175e, which is formed by bending the reinforcing surface 175d toward the back side. The fixing surface 175e is welded to the lower frame 76, so that the bridging frame 175 is fixed to the lower frame 76.

For the bridging frame 175 to support the exposure unit 50, the bridging frame 175 is required to have high rigidity. This is because if the bridging frame 175 has less rigidity, the exposure unit 50 will easily vibrate due to the vibration transmitted from the outside or the driving motor 60, and the displacement of the exposure position may cause the image defect. Thus, for increasing the rigidity of the bridging frame 175, the bridging frame 175 that supports the exposure unit 50 has a shape that increases the second moment of area of the bridging frame 175. Specifically, the bridging frame 175 includes the three bent portions, which are the above-described reinforcing surfaces 175b, 175c, and 175d. That is, the bridging frame 175 is provided with sufficient rigidity by bending a single metal plate.

Arrangement and Shape of Shield Metal Plate

Next, arrangement and a fastening method of a shield metal plate 77 of the present embodiment will be described with reference to FIGS. 21 to 24. First, the arrangement of the shield metal plate 77 and a shield method of electromagnetic noise radiated from the driving motor 60 will be described.

As described previously, the DC brush motor used in the present embodiment has a characteristic of radiating electromagnetic noise. The present embodiment causes less electromagnetic noise to be radiated to the outside of the image forming apparatus 1, by covering the driving motor 60, which is a radiation source of noise, with a metal plate that does not transmit the electromagnetic wave. For reducing the radiation of the electromagnetic noise, a shield metal plate 77 is newly added to the image forming apparatus 1.

Figure 21:
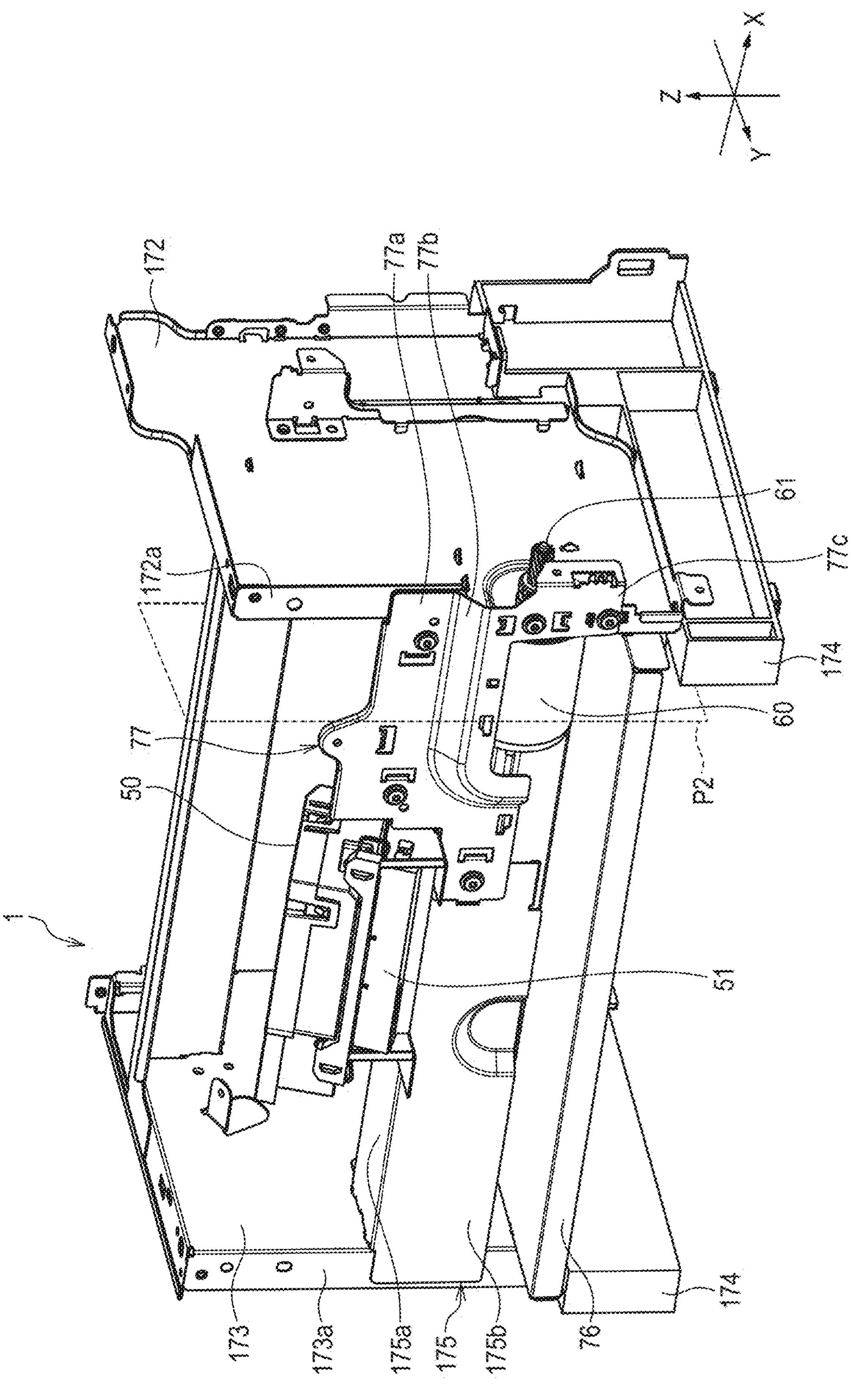
FIG. 21 is a perspective view illustrating the configuration of frames and a shield metal plate of the second embodiment.

FIG. 21 is a perspective view of a configuration of frames in which the shield metal plate 77 is added to the configuration of frames illustrated in FIG. 19. The shield metal plate 77 includes a base surface 77a, a curved surface 77b, and a shield surface 77c. The shield metal plate 77 is a single metal plate on which the drawing process (i.e., press stamping) has been performed. Both of the base surface 77a and the shield surface 77c extend substantially in an XZ plane, and the shield surface 77c is located closer to the positive side in the Y direction than the base surface 77a is. The curved surface 776 connects the base surface 77a and the shield surface 77c; and is curved so as to expand toward the positive side in the Y direction, through the drawing. The shield metal plate 77 covers one portion of the driving motor 60, and reduces the radiation of the electromagnetic noise.

As will be specifically described below, the shield metal plate 77 is disposed in an area in which the driving motor 60 is disposed in the X direction, and is connected to each of the bridging frame 175 and the right side-plate frame 172.

Figure 22:
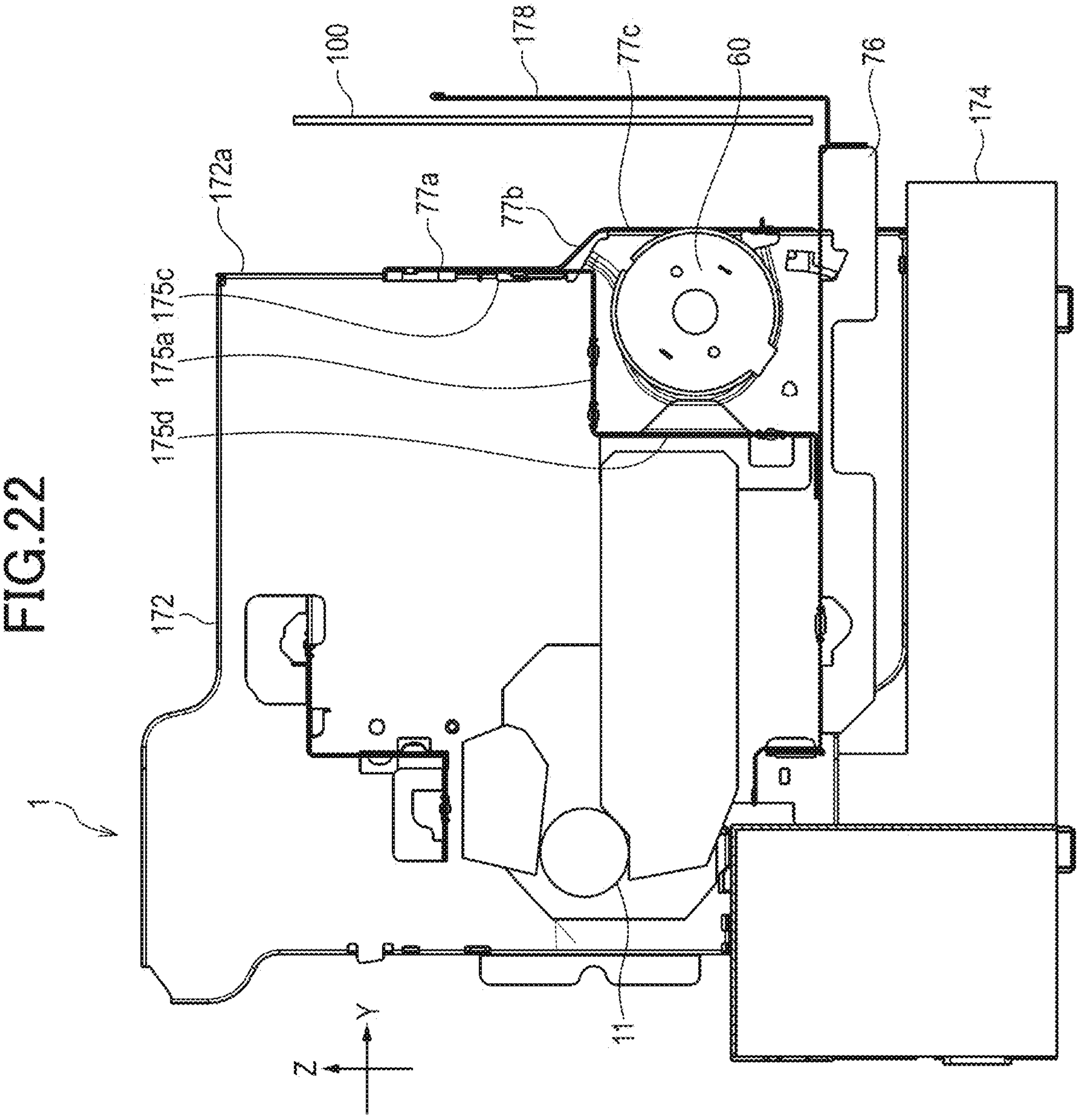
FIG. 22 is a cross-sectional view illustrating the configuration of frames and the shield metal plate of the second embodiment.

FIG. 22 is a cross-sectional view obtained by cutting the image forming apparatus 1 in a YZ plane, at a position at which the driving motor 60 is disposed. That is, FIG. 22 is a cross-sectional view in which a cross section P2 of the image forming apparatus 1 illustrated in FIG. 21 is seen in the X direction (i.e., the rotation-axis direction of the photosensitive drum 11). Note that as in FIG. 20, the left side-plate frame 173 is not illustrated in FIG. 22.

As illustrated in FIG. 22, the driving motor 60 is surrounded by the support surface 175a of the bridging frame 175 and the lower frame 76 in the Z direction. In addition, in the Y direction, the driving motor 60 is surrounded by the reinforcing surface 175d of the bridging frame 175, the shield metal plate 77, and a board stay 178. The board stay 178 is a metal plate made of metal, and is disposed closer to the outside (i.e., the positive side in the Y direction) than the circuit board 100 is. In addition, in the X direction, the driving motor 60 is surrounded by the right side-plate frame 172 and the left side-plate frame 173, as illustrated in FIGS. 19 and 21. In this manner, the electromagnetic noise radiated from the driving motor 60 is blocked substantially in all directions.

In addition, as described above, the driving motor 60 is disposed so as to project from the bent portion 172a of the right side-plate frame 172 and the reinforcing surface 175b (not illustrated in FIG. 22) of the bridging frame 175, toward the front direction (i.e., the direction opposite to the photosensitive drum 11). For this reason, the shield metal plate 77 is formed three-dimensionally by drawing one portion of the shield metal plate 77, and covers a front side of the driving motor 60.

Preferably, the shield metal plate 77 and the circuit board 100 is separated from each other by a predetermined distance so that the current that flows in the circuit board 100 does not leak to the shield metal plate 77. Thus, the depth of draw of the shield metal plate 77 is determined by the distance between the shield metal plate 77 and the circuit board 100. For this reason, the shield metal plate 77 does not cover a lower portion of the front side of the driving motor 60. The portion that is not covered by the shield metal plate 77 is covered by the board stay 178.

The shield metal plate 77 is disposed immediately near the driving motor 60, and covers an upper portion of the front side of the driving motor 60. Thus, it is not necessary to elongate the board stay 178 upward. That is, the electromagnetic noise blocked by the board stay 178 can be limited to the electromagnetic noise radiated from a lower portion of the driving motor 60. Thus, the board stay 178 can be downsized, which can reduce the size and cost of the image forming apparatus 1.

Figure 23:
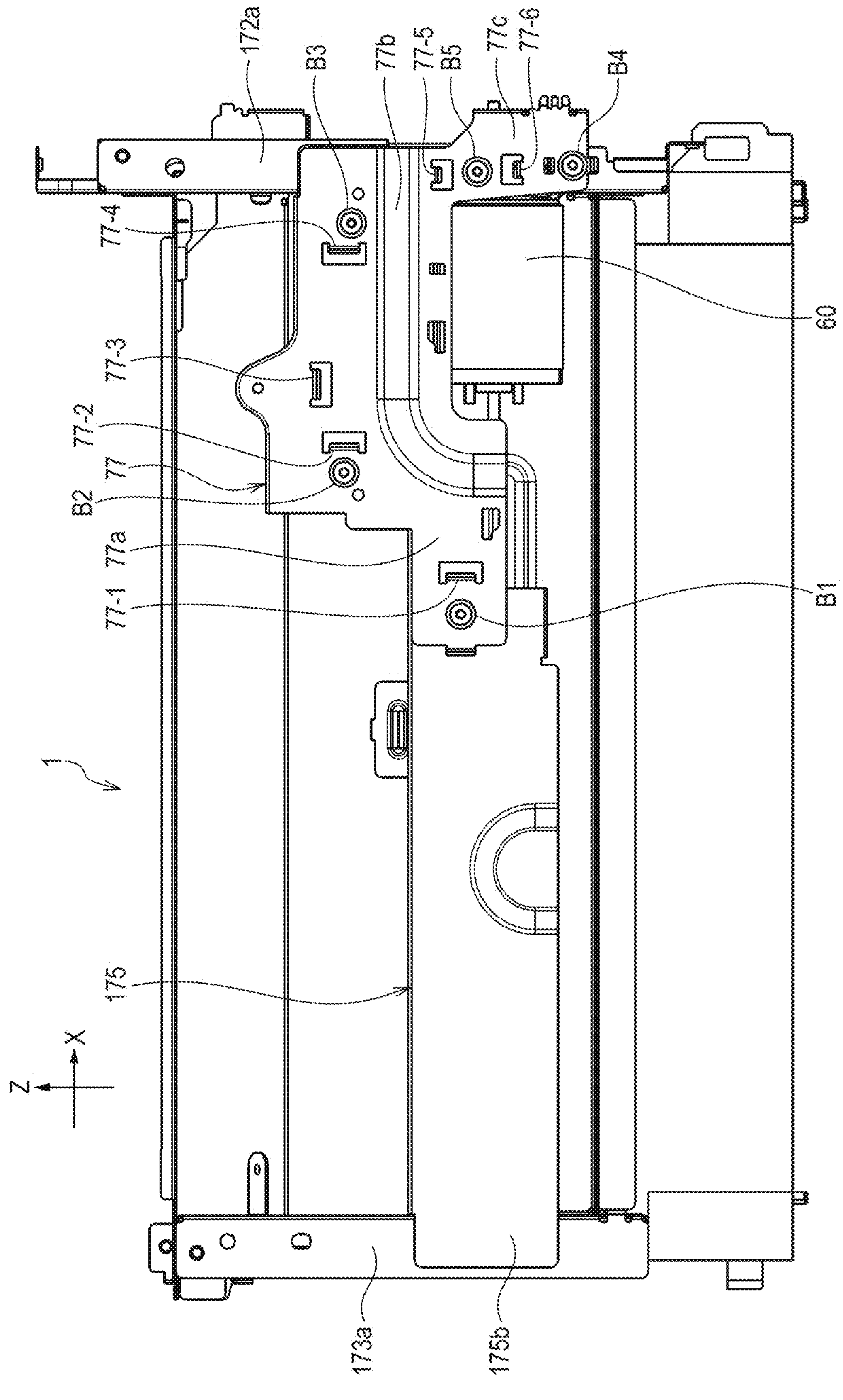
FIG. 23 is a front view illustrating the configuration of frames and the shield metal plate of the second embodiment.
Figure 24:
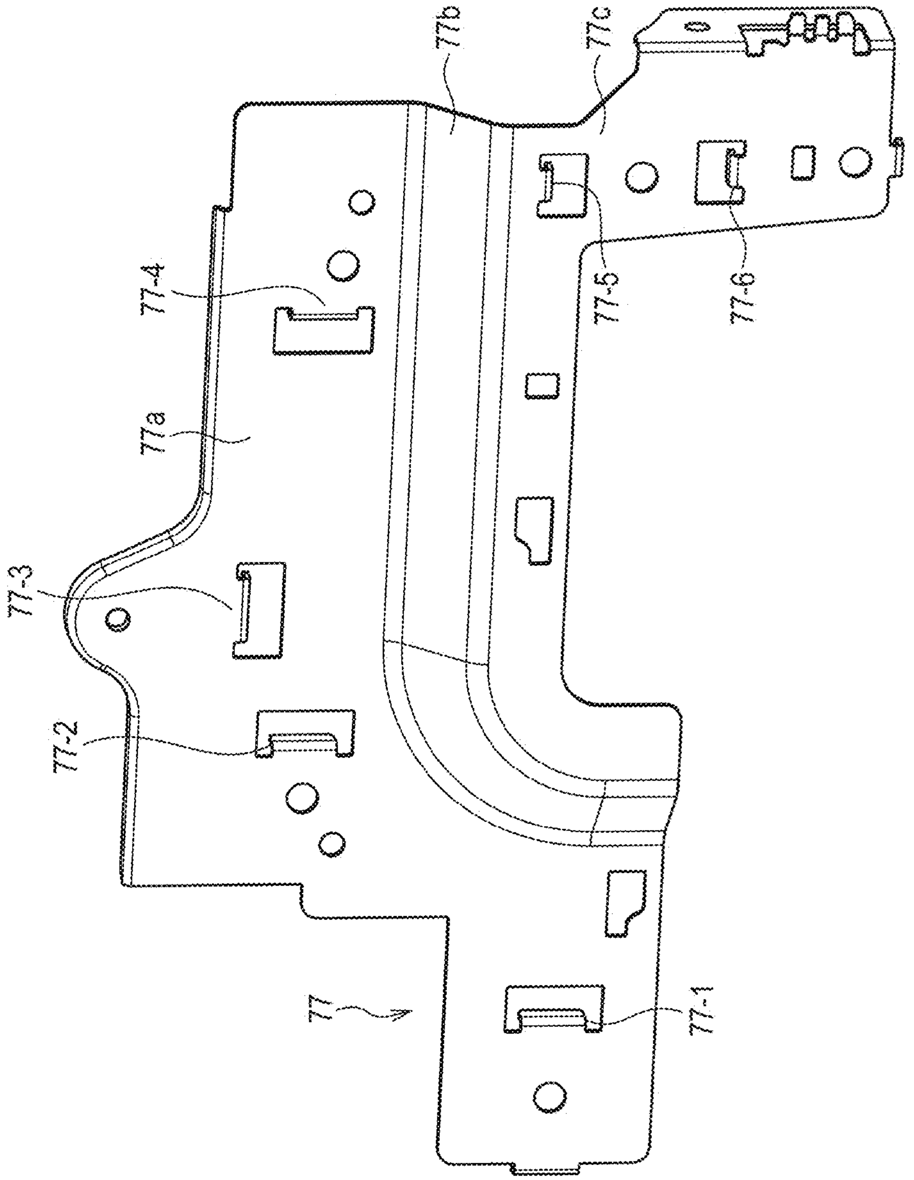
FIG. 24 is a perspective view of the shield metal plate of the second embodiment.

Next, a fastening method of the shield metal plate 77 and the rigidity of frames will be described with reference to FIGS. 23 and 24. FIG. 23 is a front view illustrating one portion of the image forming apparatus 1 to which the shield metal plate 77 is fixed. FIG. 24 is a perspective view of the shield metal plate 77.

As described previously, in the bridging frame 175, the bent portions (i.e., the reinforming surfaces 175b and 175c) are formed not continuously with each other in the X direction, for preventing the bridging frame 175 from interfering with the driving motor 60. For this reason, the rigidity of the bridging frame 175 decreases locally because the reinforcing surface 175b and 175c are separated from each other. In addition, the bent portion 172a of the right side-plate frame 172 is also formed not continuously with the bent portion 172b or 172c, due to the portion to which the driving motor 60 is fixed. Thus, the rigidity of the right side-plate frame 172 decreases locally.

In other words, the reinforcing surface 175b does not extend across the whole of the bridging frame 175 in the X direction, and the bent portion 172a also does not extend across the whole of the right side-plate frame 172 in the Z direction. That is, the rigidity of the bridging frame 175 is locally made lower than the rigidity of a bridging frame in which a bent portion extends across the whole of the bridging frame in the X direction, and the rigidity of the right side-plate frame 172 is locally made lower than the rigidity of a right side-plate frame in which a bent portion extends across the whole of the right side-plate frame in the Z direction.

As illustrated in FIG. 23, in a left area of the base surface 77*a* of the shield metal plate 77, a bent portion 77-1 is formed. As illustrated in FIG. 24, one portion of the bent portion 77-1 is bent toward the back side. The bent portion 77-1 is inserted into a rectangular hole portion formed in the reinforcing surface 175*b* of the bridging frame 175, so that the shield metal plate 77 and the bridging frame 175 are positioned with respect to each other in the up-and-down direction. In this state, the shield metal plate 77 is fastened to the reinforcing surface 175*b* of the bridging frame 175 via a screw B1.

In addition, in a right area of the base surface 77*a* of the shield metal plate 77, bent portions 77-2, 77-3, and 77-4 are formed. As illustrated in FIG. 24, one portion of each of the bent portions 77-2, 77-3, and 77-4 is bent toward the back side. The bent portions 77-2, 77-3, and 77-4 are inserted into rectangular hole portions formed in the reinforcing surface 175*c* (illustrated in FIG. 19) of the bridging frame 175, so that the shield metal plate 77 and the bridging frame 175 are positioned with respect to each other in the up-and-down direction and the right-and-left direction. In this state, the shield metal plate 77 is fastened to the reinforcing surface 175*c* of the bridging frame 175 via screws B2 and B3.

In addition, in an upper area of the shield surface 77*c* of the shield metal plate 77, a bent portion 77-5 is formed. As illustrated in FIG. 24, one portion of the bent portion 77-5 is bent toward the back side. The bent portion 77-5 is inserted into a rectangular hole portion formed in the bent portion 172*b* (illustrated in FIG. 19) of the right side-plate frame 172, so that the shield metal plate 77 and the right side-plate frame 172 are positioned with respect to each other in the right-and-left direction. In this state, the shield metal plate 77 is fastened to the bent portion 172*b* of the right side-plate frame 172 via a screw B5.

In addition, in a lower area of the shield surface 77*c* of the shield metal plate 77, a bent portion 77-6 is formed. As illustrated in FIG. 24, one portion of the bent portion 77-6 is bent toward the back side. The bent portion 77-6 is inserted into a rectangular hole portion formed in the bent portion 172*c* (illustrated in FIG. 19) of the right side-plate frame 172, so that the shield metal plate 77 and the right side-plate frame 172 are positioned with respect to each other in the right-and-left direction. In this state, the shield metal plate 77 is fastened to the bent portion 172*c* of the right side-plate frame 172 via a screw B4.

Each of the bridging frame 175 and the right side-plate frame 172 has less rigidity when they are alone. However, the rigidity of the bridging frame 175 and the right side-plate frame 172 can be increased by disposing the shield metal plate 77 between the bridging frame 175 and the right side-plate frame 172 for blocking the electromagnetic noise. That is, the shield metal plate 77 has a function to block the electromagnetic noise radiated from the driving motor 60, and a function to increase the rigidity of frames of the image forming apparatus 1.

In addition, as in the present embodiment, it is preferable that a first edge (i.e., an edge on the negative side in the X direction) of the reinforcing surface 175*b* in the X direction be connected with the left side-plate frame (second metal plate) 173 and a second edge (i.e., an edge on the positive side in the X direction) of the reinforcing surface 175*b* in the X direction be connected with the shield metal plate 77. In this structure, a structure constituted by the reinforcing surface 175*b* and the shield metal plate 77 is formed continuously from the right side-plate frame (first metal plate) 172 to the left side-plate frame (second metal plate) 173 in the X direction. As a result, the rigidity of frames of the image forming apparatus 1 can be further increased.

As described above, the present embodiment provides a configuration of frames of an image forming apparatus that allows the image forming apparatus to be downsized, that causes the frames to have high rigidity, and that reduces the electromagnetic noise to be radiated toward the outside.

More specifically, the shield metal plate 77 is disposed for blocking the electromagnetic noise radiated from the driving motor 60. As a result, the rigidity of frames can be increased, and the vibration of the exposure unit 50 and the deformation of the portion to which the driving motor 60 is fixed can be reduced.

The present disclosure at least includes the following configurations.

Configuration 1

An image forming apparatus including:
- an image bearing member configured to rotate;
- a frame member including a support surface and made of metal;
- an exposure unit configured to emit light to a surface of the image bearing member and form an electrostatic latent image thereon, the exposure unit being disposed such that when viewed in a rotation-axis direction of the image bearing member, an emission direction in which the light is emitted to the image bearing member is inclined with respect to the support surface;
- a support member made of metal and configured to support the exposure unit that is in an inclined posture with respect to the support surface; and
- a positioning member made of resin and configured to be in contact with the exposure unit and position the exposure unit,
- wherein the support surface of the frame member is in contact with at least one of the support member or the positioning member, and
- wherein the exposure unit is configured to be attached to the frame member via the support member and the positioning member.

Configuration 2

The image forming apparatus according to Configuration 1, wherein the support member is configured to constitute a support plane that is a virtual plane on which the exposure unit is positioned, and
- wherein the positioning member is configured to be in contact with the exposure unit supported by the support member, so as to position the exposure unit on the support plane.

Configuration 3

The image forming apparatus according to Configuration 2, wherein the support member is a first support member,
- wherein the image forming apparatus further includes a second support member and a third support member that are configured to support the exposure unit together with the first support member at different positions from each other when viewed in a vertical direction, and
- wherein the first support member, the second support member, and the third support member include support portions configured to support the exposure unit, and the support plane is defined by the support portions.

Configuration 4

The image forming apparatus according to any one of Configurations 1 to 3, wherein the exposure unit includes an abutted portion that is in contact with and supported by the support member, and wherein the image forming apparatus further includes an urging member configured to urge the exposure unit such that the abutted portion is prevented from being separated from the support member fixed to the frame member.

Configuration 5

The image forming apparatus according to any one of Configurations 1 to 4, wherein the exposure unit includes a first boss portion including a shaft portion, wherein the frame member includes a first hole portion which is formed in a first direction, and in which the first boss portion is configured to be fitted, and wherein the positioning member includes a second hole portion which is arranged on a first side of the positioning member, which is formed in a second direction different from the first direction, and in which the first boss portion is configured to be fitted, the first side being a side of the positioning member to which the exposure unit is attached, and a second boss portion which is arranged on a second side of the positioning member opposite to the first side and which includes a shaft portion that extends in the first direction and is configured to be fitted in the first hole portion.

Configuration 6

The image forming apparatus according to any one of Configurations 1 to 5, further including a frame body including a pair of side plates disposed at both end sides of the image bearing member in a rotation-axis direction of the image bearing member and configured to support the frame member, wherein the support member is a first support member, wherein the image forming apparatus includes a second support member that is disposed at a position separated from a position of the first support member in the rotation-axis direction, that faces the first support member in the rotation-axis direction, and that is configured to support the exposure unit attached to the positioning member, and wherein the first support member and the second support member are configured to support the exposure unit at a position upstream of an upstream edge of the frame member in an emission direction in which light is emitted from the exposure unit to the image bearing member.

Configuration 7

The image forming apparatus according to Configuration 6, further including a third support member configured to support the exposure unit at a position downstream of the first support member and the second support member in the emission direction.

Configuration 8

The image forming apparatus according to Configuration 6 or 7, wherein when viewed in the rotation-axis direction, an upstream edge of the exposure unit is located upstream of an upstream edge of the pair of side plates in the emission direction.

Configuration 9

The image forming apparatus according to Configuration 8, further including a circuit board on which a plurality of electric components is mounted, wherein the circuit board is disposed such that when viewed in the rotation-axis direction, at least one of the plurality of electric components is disposed upstream of the upstream edge of the pair of side plates in the emission direction and below the exposure unit in a vertical direction.

Configuration 10

The image forming apparatus according to Configuration 9, wherein the positioning member includes a blocking wall disposed to separate the exposure unit and the one of the plurality of electric components from each other.

Configuration 11

The image forming apparatus according to any one of Configurations 1 to 10, further including:

a first metal plate configured to support a first end portion of the image bearing member in the rotation-axis direction of the image bearing member, and a second metal plate configured to support a second end portion of the image bearing member opposite to the first end portion in the rotation-axis direction, wherein the frame member is a third metal plate extending between the first metal plate and the second metal plate in the rotation-axis direction and connected to each of the first metal plate and the second metal plate.

Configuration 12

An image forming apparatus including:

an image bearing member configured to rotate;

a first metal plate configured to support a first end portion of the image bearing member in a rotation-axis direction of the image bearing member, a second metal plate configured to support a second end portion of the image bearing member opposite to the first end portion in the rotation-axis direction;

a frame member disposed between the first metal plate and the second metal plate in the rotation-axis direction and connected to each of the first metal plate and the second metal plate; and a motor configured to drive at least one of the image bearing member, a conveyance member configured to convey a recording material, or a process member configured to form an image on the recording material, the motor being disposed on the first metal plate and positioned between the first metal plate and the second metal plate in the rotation-axis direction, wherein the frame member includes a reinforcing surface formed in an area in the rotation-axis direction in which the motor is not disposed, wherein when viewed in the rotation-axis direction, the reinforcing surface and the motor partially overlap with each other and the motor projects from the reinforcing surface toward a direction opposite to the image bearing member, and wherein the image forming apparatus further includes a shield metal plate disposed in an area in the rotation-axis direction in which the motor is disposed, connected to each of the first metal plate and the frame member, and configured to cover a portion of the motor when viewed from a direction opposite to the image bearing member.

Configuration 13

The image forming apparatus according to Configuration 12, wherein a first edge of the reinforcing surface in the rotation-axis direction is connected with the second metal plate, and wherein a second edge of the reinforcing surface opposite to the first edge in the rotation-axis direction is connected with the shield metal plate such that a structure constituted by the reinforcing surface and the shield metal plate is formed continuously from the first metal plate to the second metal plate.

Configuration 14

The image forming apparatus according to Configuration 12 or 13, further including an exposure unit configured to expose the image bearing member, wherein the frame member includes a support surface which extends in the rotation-axis direction and on which the exposure unit is supported.

Configuration 15

The image forming apparatus according to Configuration 14, wherein the frame member includes a second reinforcing surface extending in the rotation-axis direction, and wherein when viewed in the rotation-axis direction, the second reinforcing surface is positioned between the motor and the image bearing member.

Configuration 16

The image forming apparatus according to Configuration 15, wherein the frame member includes a third reinforcing surface extending over the area in the rotation-axis direction in which the motor is disposed, and wherein the shield metal plate is fixed to the reinforcing surface and the third reinforcing surface.

Configuration 17

The image forming apparatus according to Configuration 16, wherein the frame member is a single metal plate, and wherein the reinforcing surface, the support surface, the second reinforcing surface, and the third reinforcing surface are formed by bending the single metal plate.

Configuration 18

The image forming apparatus according to any one of Configurations 14 to 17, wherein the support surface of the frame member includes projection portions projecting toward one side and another side in the rotation-axis direction, and wherein the frame member is connected with the first metal plate and the second metal plate by the projection portions fitting in opening portions formed in the first metal plate and the second metal plate.

Configuration 19

The image forming apparatus according to Configuration 16 or 17, wherein each of the first metal plate and the second metal plate includes a bent portion, and wherein the frame member is fixed to the first metal plate and the second metal plate by the reinforcing surface of the frame member being fixed to the bent portion of the second metal plate, and the third reinforcing surface of the frame member being fixed to the bent portion of the first metal plate.

Configuration 20

The image forming apparatus according to Configuration 19, wherein when viewed in the rotation-axis direction, the motor projects from the bent portion of the first metal plate toward a direction opposite to the image bearing member, and wherein the first metal plate includes a second bent portion formed lower than the bent portion of the first metal plate in a vertical direction.

Configuration 21

The image forming apparatus according to Configuration 20, wherein the shield metal plate is fixed to the reinforcing surface and the third reinforcing surface of the frame member, and to the second bent portion of the first metal plate.

Configuration 22

The image forming apparatus according to any one of Configurations 12 to 21, wherein the shield metal plate is a single metal plate, and a portion of the shield metal plate is curved in accordance with a shape of the motor.

OTHER EMBODIMENTS

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2021-191856, filed on Nov. 26, 2021, and 2021-206460, filed on Dec. 20, 2021, which are hereby incorporated by reference herein in their entirety.

What is claimed is:

1. An image forming apparatus comprising:

an image bearing member configured to rotate;

a first metal plate configured to support a first end portion of the image bearing member in a rotation-axis direction of the image bearing member;

a second metal plate configured to support a second end portion of the image bearing member opposite to the first end portion in the rotation-axis direction;

a frame member disposed between the first metal plate and the second metal plate in the rotation-axis direction and connected to each of the first metal plate and the second metal plate; and a motor configured to drive at least one of the image bearing member, a conveyance member configured to convey a recording material, or a process member configured to form an image on the recording material, the motor being disposed on the first metal plate and positioned between the first metal plate and the second metal plate in the rotation-axis direction, wherein the frame member includes a reinforcing surface formed in an area in the rotation-axis direction in which the motor is not disposed, wherein when viewed in the rotation-axis direction, the reinforcing surface and the motor partially overlap with each other and a portion of the motor projects from the reinforcing surface toward a direction opposite to the image bearing member, and wherein the image forming apparatus further includes a shield metal plate disposed in an area in the rotation-axis direction in which the motor is disposed, connected to each of the first metal plate and the frame member, and configured to cover the portion of the motor from a direction side opposite to the image bearing member.

2. The image forming apparatus according to claim 1, wherein a first edge of the reinforcing surface in the rotation-axis direction is connected with the second metal plate, and wherein a second edge of the reinforcing surface opposite to the first edge in the rotation-axis direction is connected with the shield metal plate such that a structure constituted by the reinforcing surface and the shield metal plate is formed continuously from the first metal plate to the second metal plate.

3. The image forming apparatus according to claim 1, further comprising an exposure unit configured to expose the image bearing member, wherein the frame member includes a support surface which extends in the rotation-axis direction and on which the exposure unit is supported.

4. The image forming apparatus according to claim 3, wherein the frame member includes a second reinforcing surface extending in the rotation-axis direction, and wherein when viewed in the rotation-axis direction, the second reinforcing surface is positioned between the motor and the image bearing member.

5. The image forming apparatus according to claim 4, wherein the frame member includes a third reinforcing surface extending over the area in the rotation-axis direction in which the motor is disposed, and wherein the shield metal plate is fixed to the reinforcing surface and the third reinforcing surface.

6. The image forming apparatus according to claim 5, wherein the frame member is a single metal plate, and wherein the reinforcing surface, the support surface, the second reinforcing surface, and the third reinforcing surface are formed by bending the single metal plate.

7. The image forming apparatus according to claim 3, wherein the support surface of the frame member includes projection portions projecting toward one side and another side in the rotation-axis direction, and wherein the frame member is connected with the first metal plate and the second metal plate by the projection portions fitting in opening portions formed in the first metal plate and the second metal plate.

8. The image forming apparatus according to claim 5, wherein each of the first metal plate and the second metal plate includes a bent portion, and wherein the frame member is fixed to the first metal plate and the second metal plate by the reinforcing surface of the frame member being fixed to the bent portion of the second metal plate, and the third reinforcing surface of the frame member being fixed to the bent portion of the first metal plate.

9. The image forming apparatus according to claim 8, wherein when viewed in the rotation-axis direction, the motor projects from the bent portion of the first metal plate toward a direction opposite to the image bearing member, and wherein the first metal plate includes a second bent portion formed lower than the bent portion of the first metal plate in a vertical direction.

10. The image forming apparatus according to claim 9, wherein the shield metal plate is fixed to the reinforcing surface and the third reinforcing surface of the frame member, and to the second bent portion of the first metal plate.

11. The image forming apparatus according to claim 1, wherein the shield metal plate is a single metal plate, and a portion of the shield metal plate is curved in accordance with a shape of the motor.

* * * * *